United States Patent [19]
Russell

[11] Patent Number: 5,349,134
[45] Date of Patent: Sep. 20, 1994

[54] CORNER MOUNTED WIRING DEVICES

[76] Inventor: James P. Russell, Claridge House II - Apt. 2IW, Verona, N.J. 07044

[21] Appl. No.: 775,781

[22] Filed: Oct. 11, 1991

Related U.S. Application Data

[63] Continuation-in-part of Ser. No. 484,822, Feb. 26, 1990, Pat. No. 5,057,980.

[51] Int. Cl.$^5$ .............................................. H02G 3/10
[52] U.S. Cl. ...................................... 174/48; 174/53; 174/58; 220/3.9; 248/220.1; 248/906; 362/370; 362/432; 379/435; 439/571
[58] Field of Search ................ 174/48, 53, 54, 58; 439/571, 572, 573, 676; 248/906, 220.1; 362/147, 368, 370, 432; 379/435; 220/3.2, 3.3, 3.9, 3.92

[56] References Cited

U.S. PATENT DOCUMENTS

| | | | |
|---|---|---|---|
| 1,599,654 | 9/1926 | Cranston | 248/220.1 X |
| 2,254,847 | 9/1941 | Holt | 248/220.1 |
| 2,363,816 | 11/1944 | Svikhart | 379/454 |
| 2,688,417 | 9/1954 | Bowers | 220/3.9 |
| 2,800,577 | 7/1957 | Block | 362/227 |
| 3,197,548 | 7/1965 | Weitzman et al. | 174/58 |
| 3,471,656 | 10/1969 | Quigley | 379/454 |
| 3,783,931 | 1/1974 | Assael | 248/220.1 X |
| 4,217,629 | 8/1980 | Russell | 362/147 |
| 4,407,559 | 10/1983 | Meyer | 439/676 X |

OTHER PUBLICATIONS

Security Distributing & Marketing, Jul., 1982, p. 43 "Arrowhead's New S8600 . . . ".
Security Distributing & Marketing, Aug. 1984, pp. 80 and 81, "Protecting Building Interiors".
Specification sheet on "Passive Infrared: IR180", Arrowhead Technologies, copyright 1989.

Primary Examiner—Leo P. Picard
Assistant Examiner—David A. Tone
Attorney, Agent, or Firm—Brooks Haidt Haffner & Delahunty

[57] ABSTRACT

Lighting fixture has a self-contained triangular junction box that mounts in the corner of a room or space with the box cover secured as a permanent part of the shade-like lamp housing. The lamp housing has a back panel with a cut-out that slips over the corner mounted junction box, the box cover extending into the housing for registration with the open side of the box when the housing is in place. A single screw joins the box cover to the box and thereby secures the lamp housing thereto. An electrical device mounting system employs various adapter structures that mount in the corner of a room and by means of which various junction boxes, or other electrical components, can be fastened in the corner of a room catercorner thereto. A series of structures are illustrated for corner mounting of telephone equipment such as jacks, wall mountable instruments, and the like.

16 Claims, 15 Drawing Sheets

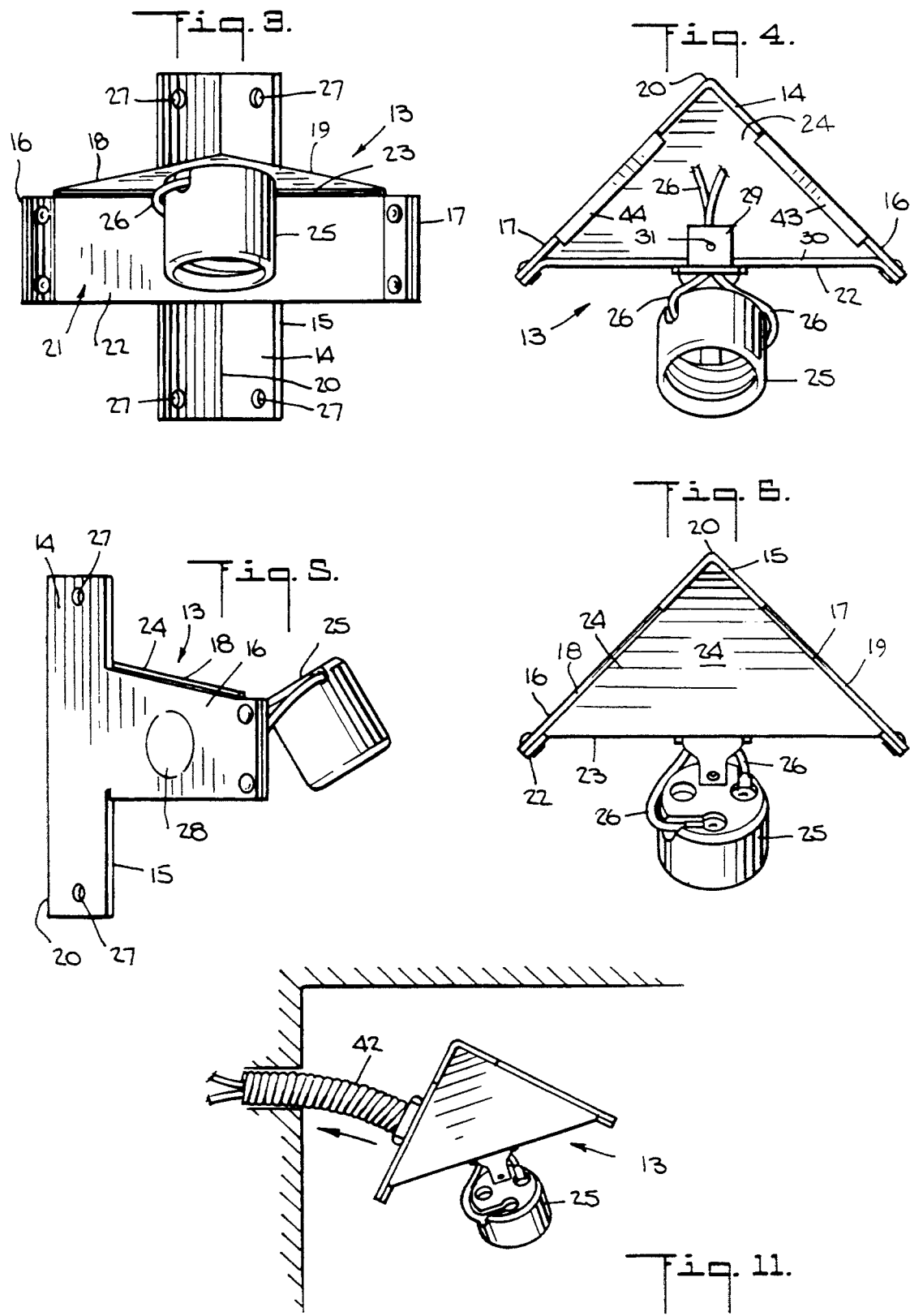

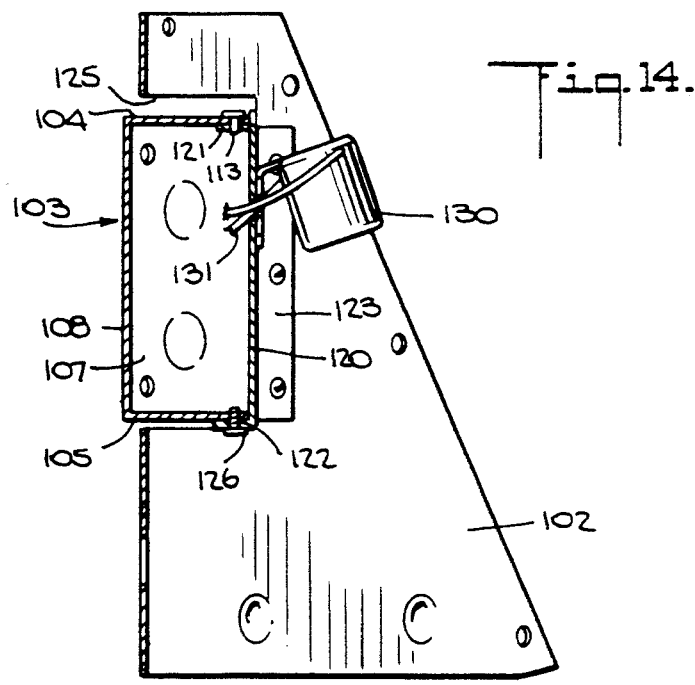
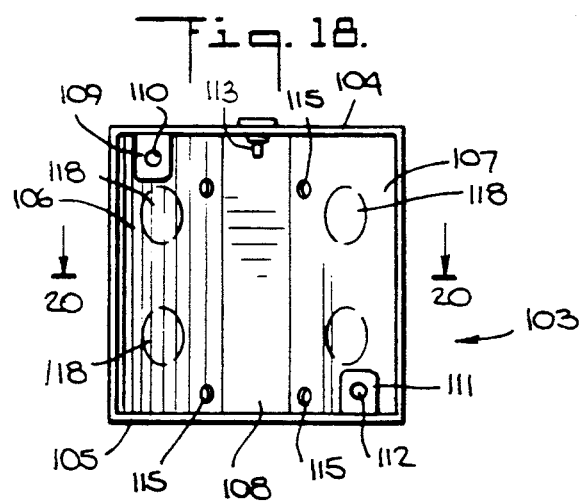
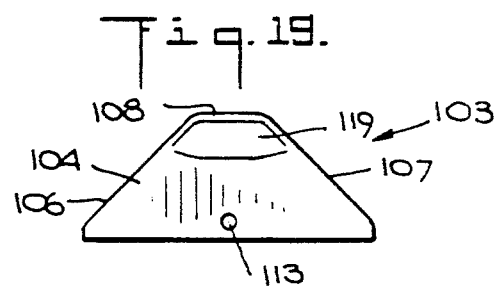
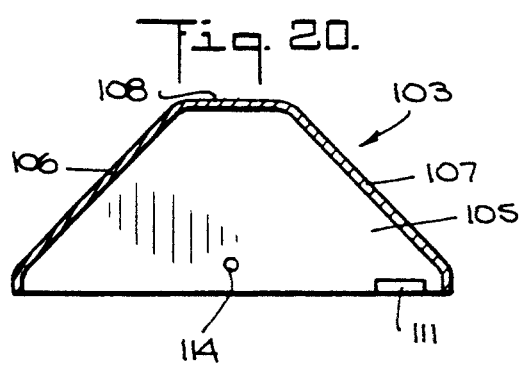

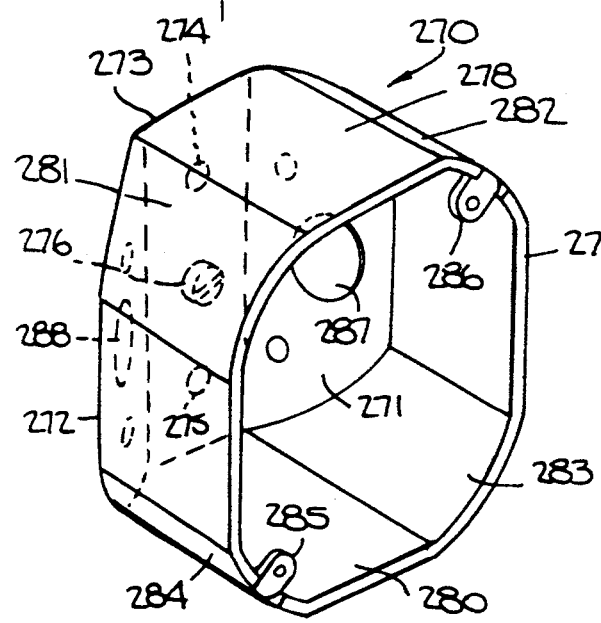
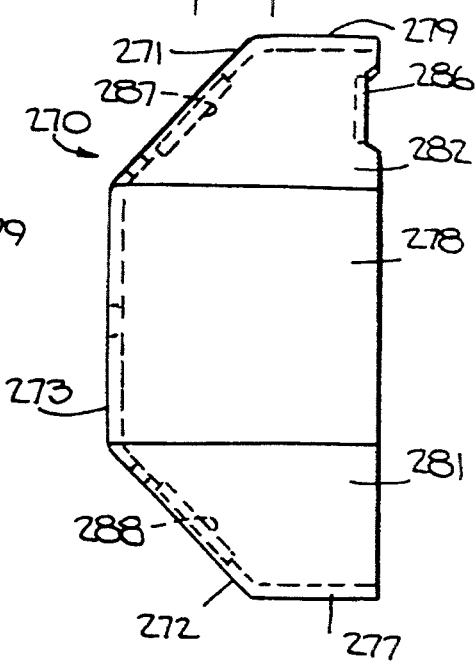
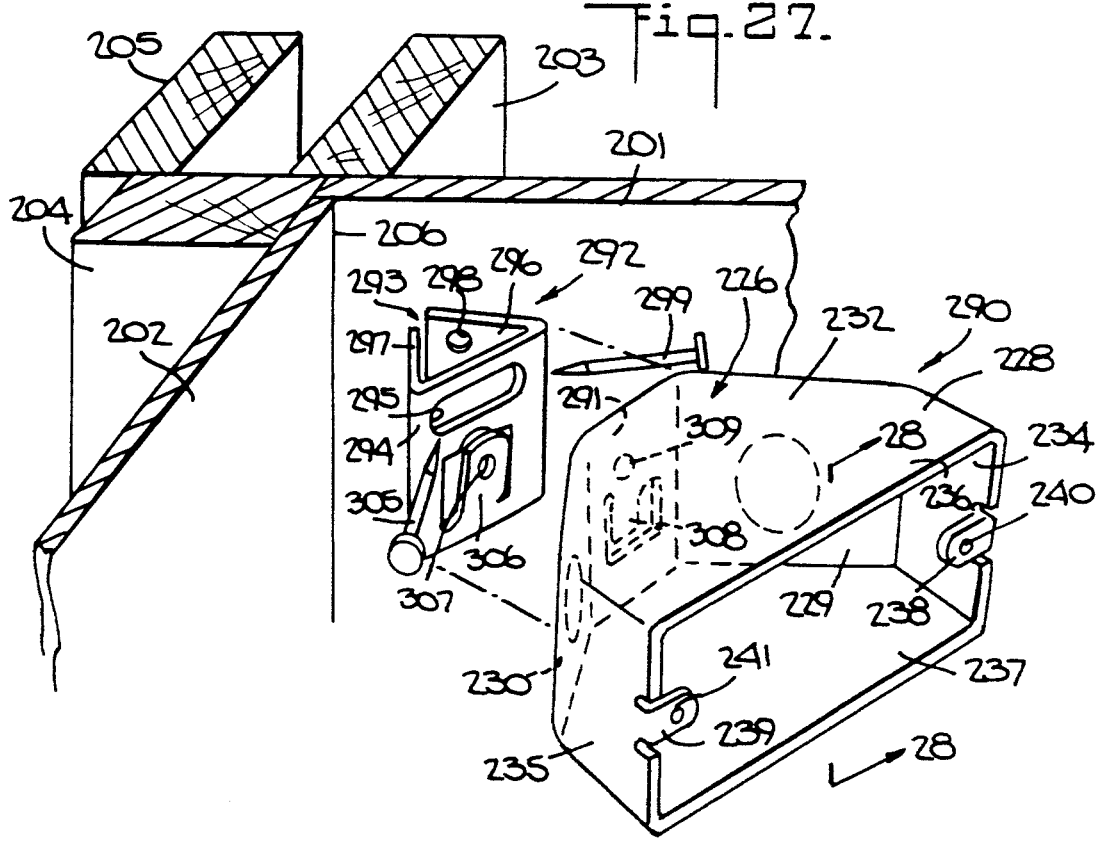

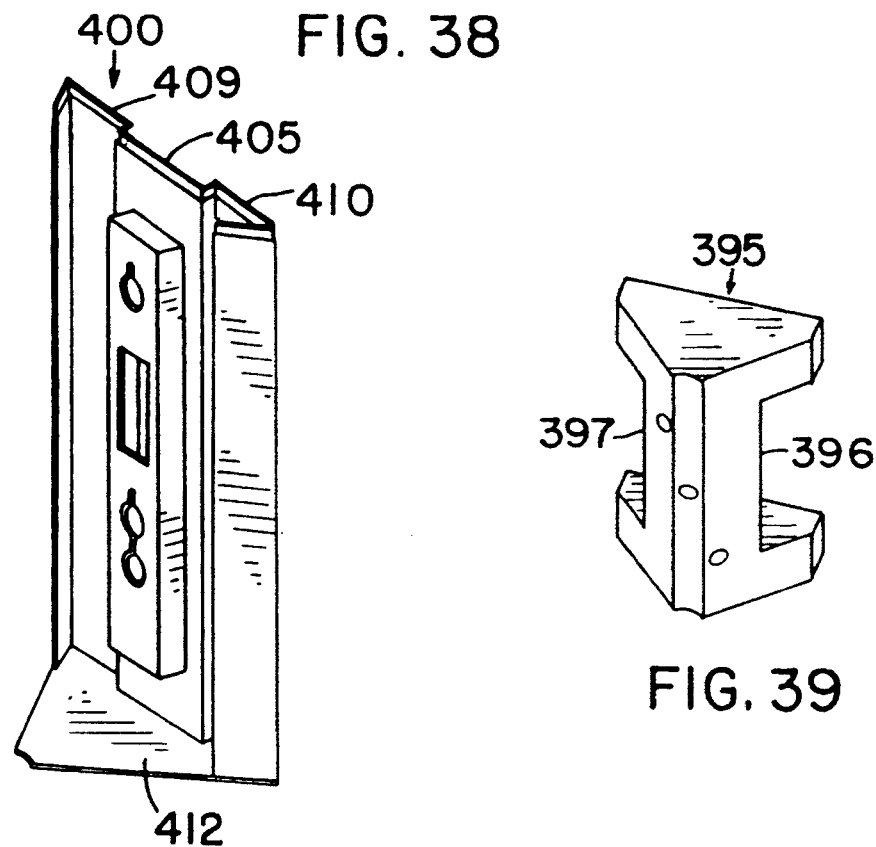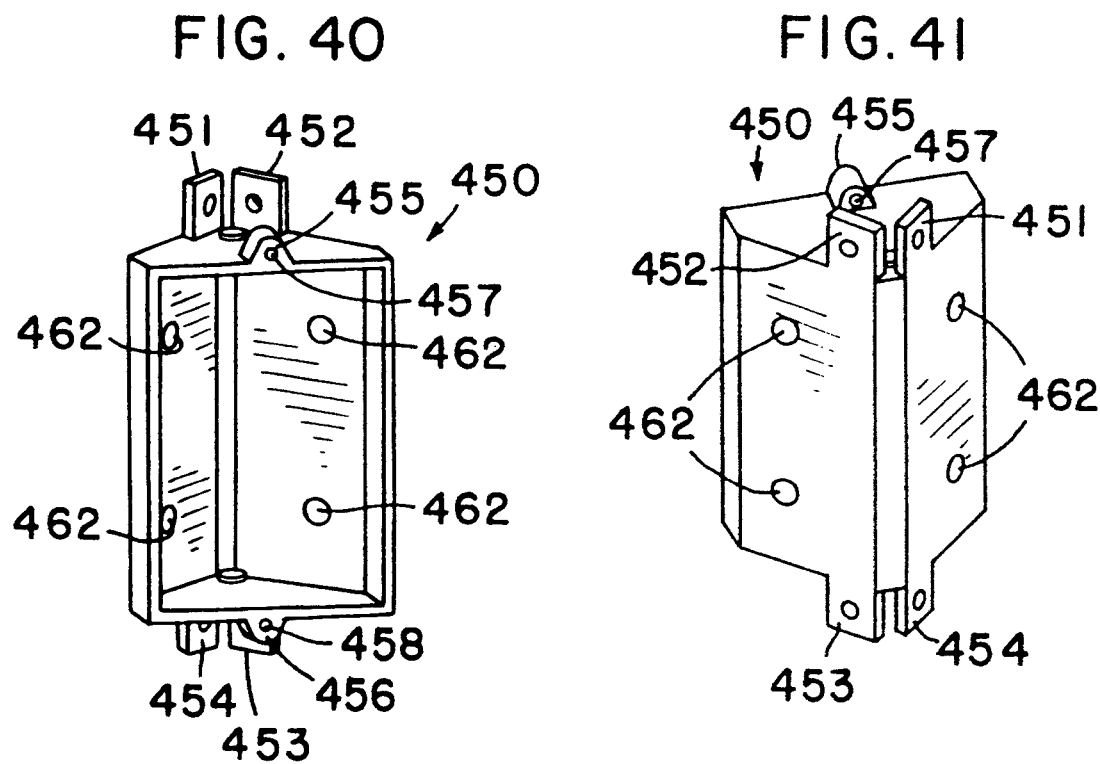

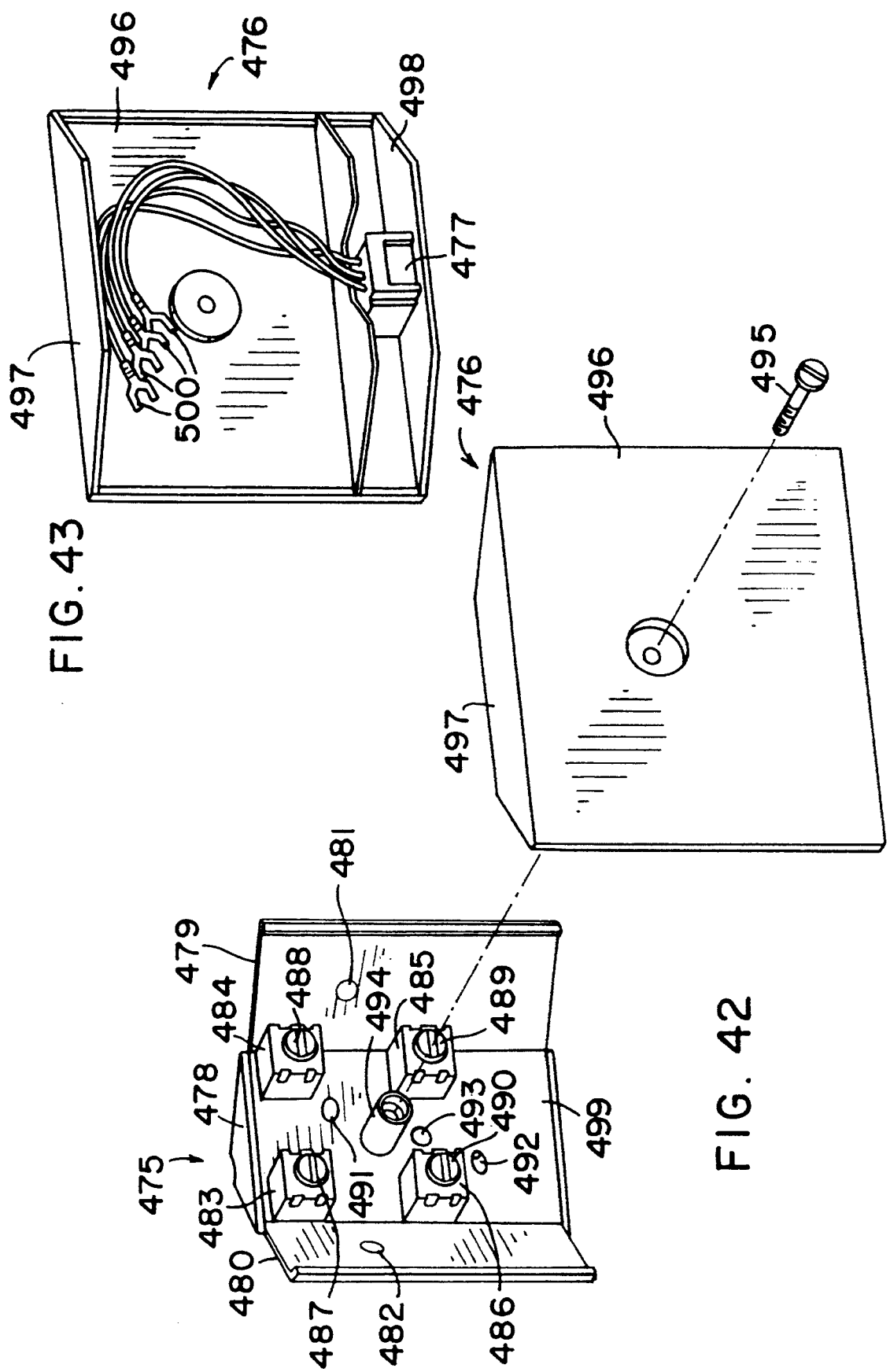

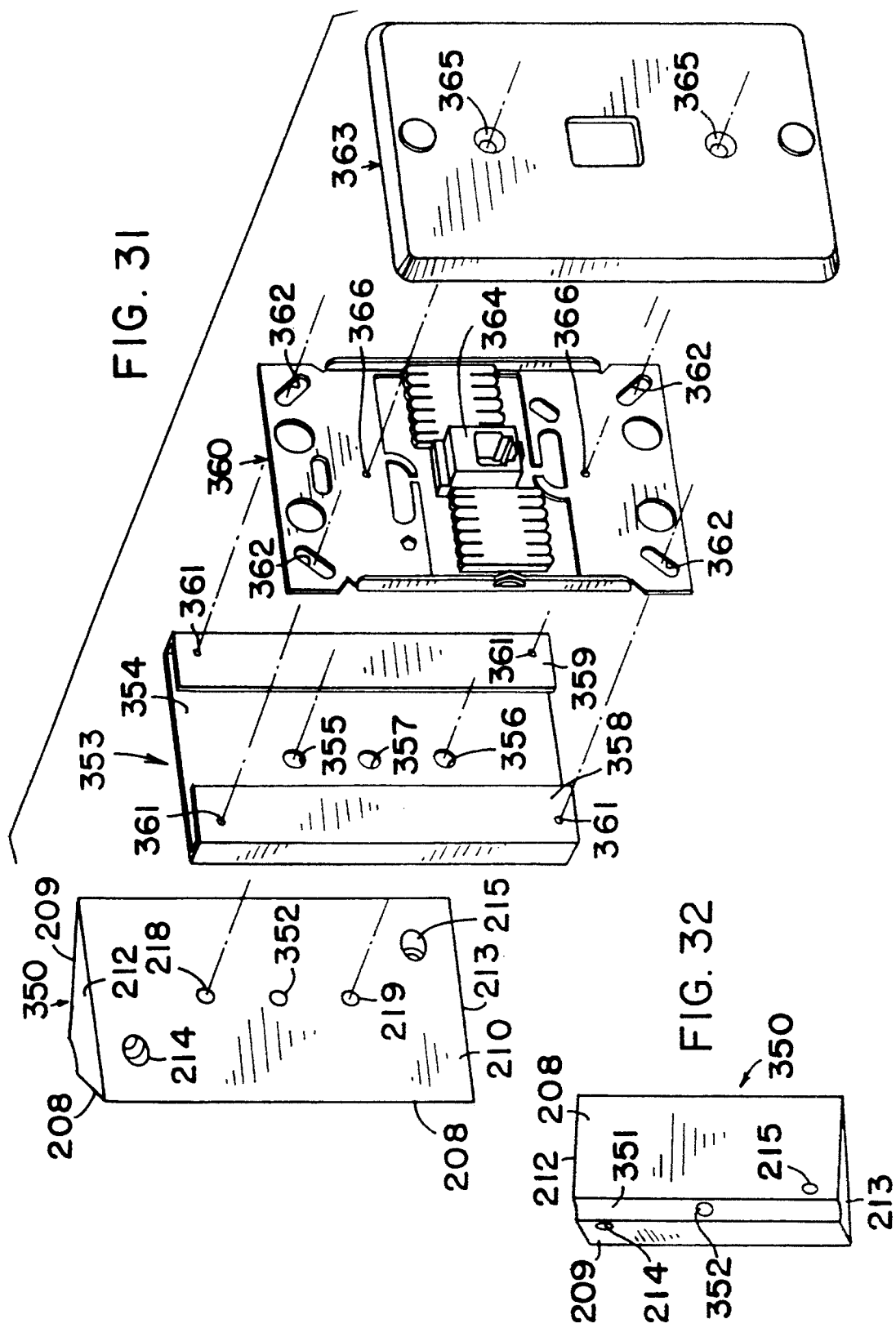

CORNER MOUNTED WIRING DEVICES

BACKGROUND OF THE INVENTION

This application is a continuation-in-part of International application No. PCT/US91/01250, filed 25 Feb. 1991, designating the United States, which application is a continuation-in-part of U.S. application Ser. No. 07/484,822, filed Feb. 26, 1990 now U.S. Pat. No. 5,057,980.

The present invention relates to a corner lighting fixture for permanent installation in a corner between two intersecting walls, to electrical junction boxes for that purpose, and to a mounting system for room corner mounting of electrical wiring devices.

In my U.S. Pat. No. 4,217,629, issued Aug. 12, 1980 for a "Corner Lighting Assembly", a portable lamp assembly is described having particular utility providing illumination for fostering plant growth. An object of that invention was to provide a corner lightweight portable lamp assembly that was easily mounted, fit snugly in the corner of a room regardless of irregularities in the adjacent wall surface or corner, was adapted to blend unobtrusively into its surroundings, and provided optimal control and projection of plant growth fostering illumination. To provide mounting flexibility, exposed wiring was employed and concealed behind decorative trim strips.

There are occasions, however, when it is desirable to permanently install lighting fixtures similar in overall outward configuration to those described in my said earlier patent. While numerous patents have been issued for corner lighting fixtures, the patents that have come to my attention, namely U.S. Pat. Nos. 1,900,436; 2,428,827; 2,800,577; 4,246,629; 4,338,653 and 4,352,151, all concentrate on the luminaire and avoid any illustration of the electrical junction box with which the fixture is to be connected. In each instance one must assume that a junction box would be located recessed in the wall with an opening facing into the room and that the fixture would have some means of fastening it either to the junction box or to the surrounding building structure. This often results in a redundancy of structure in that the lighting fixture is usually provided with a chase or wire way where electrical connections are made, and additional connections are made in the built in junction box.

There are also occasions when it is desirable to provide electrical wiring devices in a room corner. Such devices might contain jacks for telephones, TV cable jacks, electric convenience outlets, and the like. Heretofore, conventional practice and hardware limited installation to side walls spaced from a room corner and often necessitating the use of either fixed or loose surface wiring to reach a corner.

SUMMARY OF THE PRESENT INVENTION

With the foregoing in mind, it is an object of the present invention to provide an arrangement for permanently installing shade-like lamp housings of the general type described in my prior patent.

A further object is to provide for such installation in a manner not requiring a conventional recessed junction box.

A still further object is to provide a lighting fixture having a surface mounted junction box, and a plurality of interchangeable shade-like lamp housings for use therewith.

Yet another object is to provide means for mounting electrical wiring devices in a corner of a room catercorner thereto.

A further object is to provide modified junction boxes and the like designed to fit snugly in room corners in an aesthetic and functional manner, and to provide mounting or adapter means for such boxes, and for other wiring devices.

In accordance with one aspect of the invention, there is provided a lighting fixture for permanent installation in a corner between two intersecting walls comprising in combination a junction box with rear walls shaped to fit snugly in said corner, means for enabling said junction box to be fastened to said intersecting walls in said corner, entry means on said junction box for admitting electric branch circuit wiring and securing such wiring against separating from said junction box, a screw socket for receiving a bulb, said socket being mounted on another wall of said junction box with wiring passing therethrough into said box for electrical connection to said branch circuit wiring, at least one wall of said junction box other than said rear walls thereof being separable and removable from said junction box to permit access to the interior of said junction box, all of said removable junction box walls being joined to the rear walls of a shade-like lamp housing constructed and arranged with a rear opening for receiving said junction box therethrough all of said removable junction box walls being located for assembly to said junction box when said lamp housing is positioned over said junction box, means for fastening said removable junction box walls to said junction box for closing said junction box while simultaneously mounting said lamp housing.

In accordance with another aspect of the invention there is provided an electrical junction box for permanent installation in a corner of a room between two intersecting walls, said junction box having rear walls shaped to fit snugly in said corner while positioning the junction box symmetrically about the corner bisecting plane, means for enabling said junction box to be fastened symmetrically about said bisecting plane to said intersecting walls in said corner, entry means on said junction box for admitting electric wiring and securing such wiring against separating from said junction box, said junction box having side walls that terminate in straight edges bounding an opening to the junction box and lying in a common plane which plane is located catercorner to said intersecting walls of the room when said junction box is fastened in said corner, and means for securing to said straight edges means for closing said junction box.

In accordance with yet another aspect of the invention there is provided a mounting system for mounting electrical wiring devices in a corner of a room between two intersecting walls, comprising a mounting adapter having a cross-section configured and dimensioned to fit in said room corner between said corner and said devices and having a surface which when the adapter is mounted in said room corner is positioned catercorner to said intersecting walls to which a rear wall of said devices can be securely fastened for positioning said devices symmetrically about said bisecting plane catercorner to said intersecting walls, said adapter having means for receiving fasteners in one or more locations in sufficient proximity to the room corner for securing the adapter to room corner studs. With certain devices the system contemplates forming the devices, or at least a part of the devices, integral with the adapter or mounting structure.

BRIEF DESCRIPTION OF THE DRAWINGS

The invention will be better understood after reading the following detailed description of the presently preferred embodiments thereof with reference to the appended drawings in which:

FIG. 3 is a front elevational view of the junction box constituting a component part of the fixture of FIGS. 1 and 2;

FIG. 4 is a bottom view of the junction box of FIG. 3;

FIG. 5 is a side elevational view of the junction box of FIG. 3;

FIG. 6 is a top view of the same junction box;

FIG. 11 is a top view of the junction box of FIGS. 3 to 6, showing it in the process of being installed in a room corner after attaching a branch circuit conduit thereto;

FIG. 14 is a vertical sectional view taken along the line 14—14 in FIG. 12;

FIG. 18 is a front elevational view of the junction box minus its cover as seen in FIG. 13;

FIG. 19 is a top plan view of the junction box in FIG. 18;

FIG. 20 is a transverse sectional view taken along the line 20—20 in FIG. 18;

FIG. 25 is a perspective view of an octagonal box that can be mounted using the system shown in FIGS. 21 to 24;

FIG. 26 is a top plan view of the box of FIG. 25;

FIG. 27 is a view similar to FIG. 21 but showing a modified mounting adapter and the corresponding modified junction box;

FIG. 31 is an exploded perspective view of a corner adapter and special mounting plate for mounting in the corner a telephone modular jack backplate with wire connectors and an instrument mounting faceplate;

FIG. 32 is a rear perspective view of the corner adapter used in the assembly of FIG. 31;

FIG. 38 is a perspective view of the rear of the backboard in FIG. 37;

FIG. 39 is a perspective view of the rear of the corner adapter in FIG. 37;

FIG. 40 is a front perspective view of a corner junction box embodying the invention and designed to take the place of the corner adapter in the embodiments of FIGS. 31, 33, and 37;

FIG. 41 is a rear perspective view of the corner junction box in FIG. 40;

FIG. 42 is an exploded perspective view of yet another embodiment of the invention in which the terminal posts of a prewire modular jack assembly are formed integral with a corner adapter, and a cover containing the jack is attachable thereto; and FIG. 43 is a perspective view of the rear of the cover member of the assembly in FIG. 42.

The same reference numerals are used throughout the drawings to designate the same or similar parts.

DETAILED DESCRIPTION OF THE PRESENTLY PREFERRED EMBODIMENTS

Figure 2:
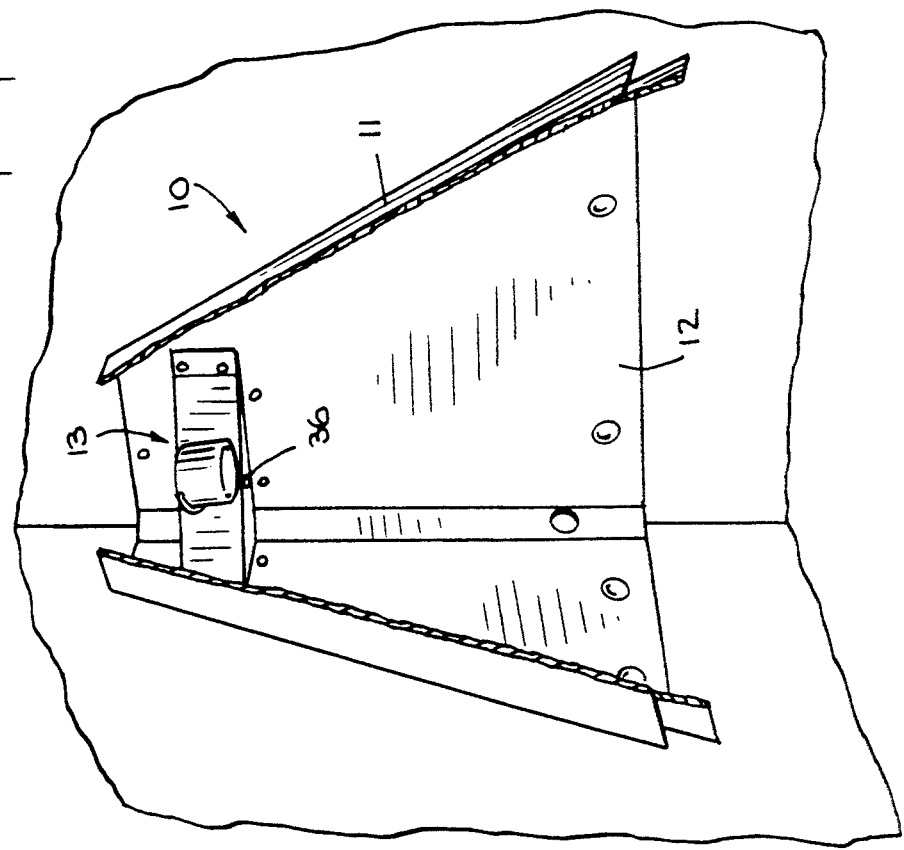
FIG. 2 is a view similar to FIG. 1, but with the front decorative panels of the fixture broken away to show the interior construction of a first embodiment of the invention.
Figure 1:
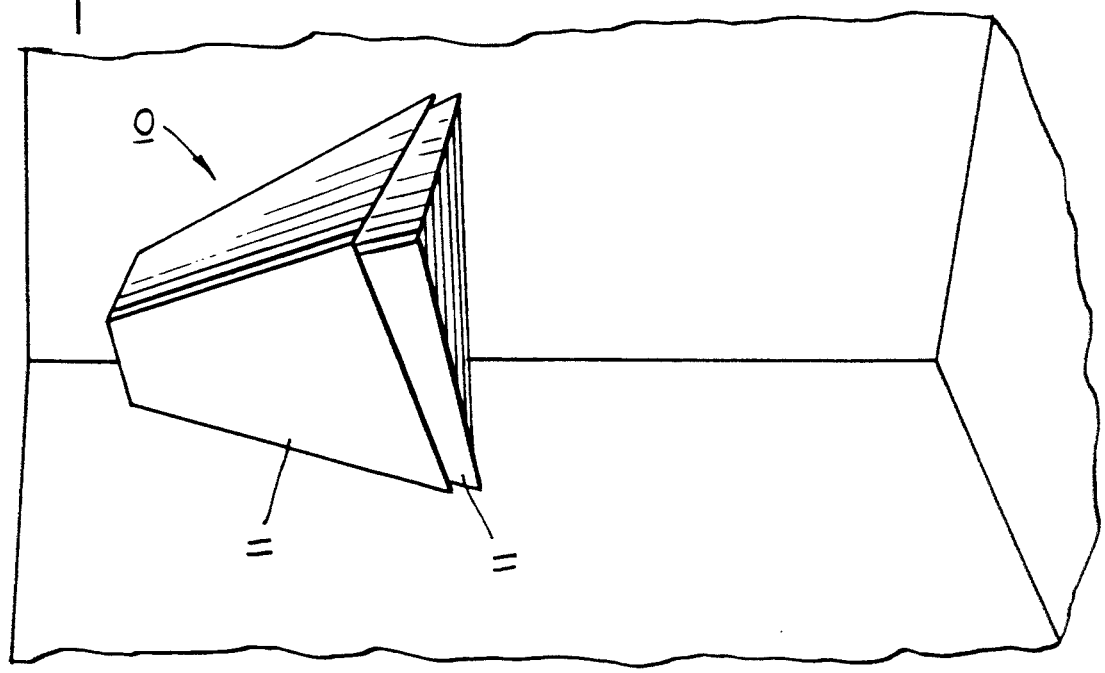
FIG. 1 is a front perspective view of an exemplary corner lighting fixture embodying the present invention and shown mounted in a corner of a room.
Figure 7:
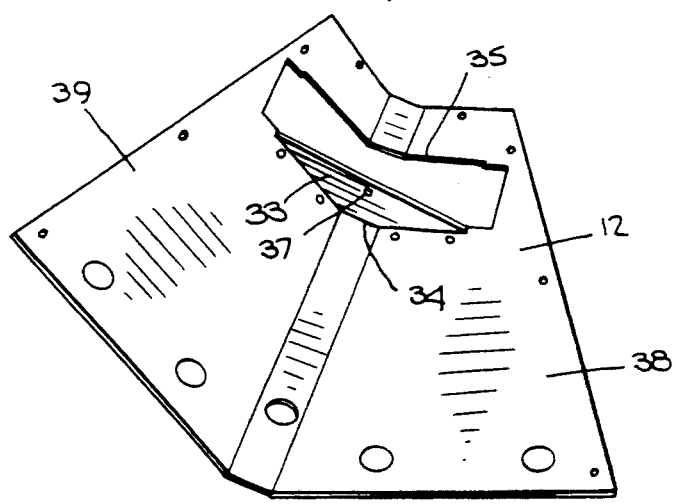
FIG. 7 is a perspective view of the rear panel of the light fixture of FIGS. 1 and 2, before assembly of the front decorative panel and separated from the junction box, for the purpose of more clearly illustrating its construction.
Figure 8:
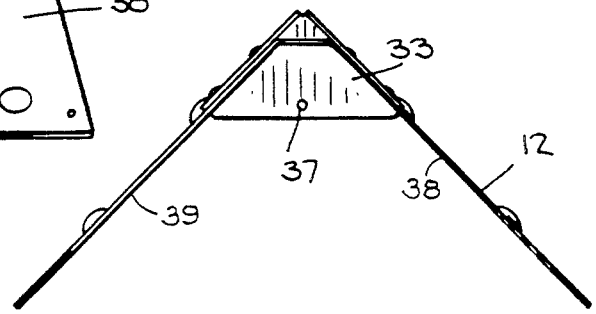
FIG. 8 is a top view of the structure of FIG. 7.
Figure 9:
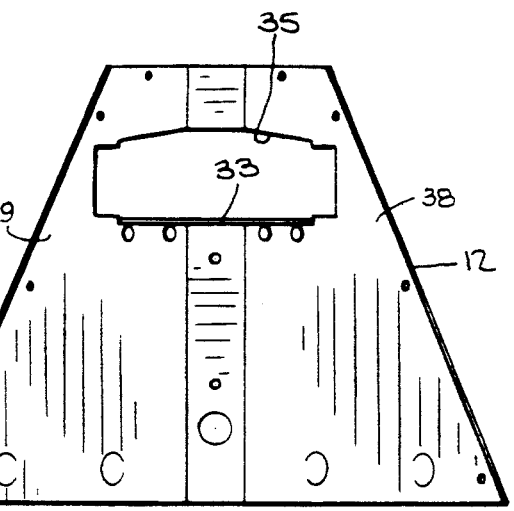
FIG. 9 is a front elevational view of the structure of FIG. 7.

Referring to the drawings, and initially to FIGS. 1 to 11, the shade-like lamp housing is designated generally by the numeral 10 and consists essentially of a decorative front panel or panels 11 and a rear panel 12. The front panel 11 can be joined to the side edges of the rear panel either by spot welding or riveting or in any other suitable manner. However, the present invention is directed primarily to the construction of the rear panel 12, the junction box and the relationship therebetween. Before further discussing the panel 12 of the fixture, it will be more convenient to consider the junction box 13 shown in detail in FIGS. 3 to 6.

The junction box 13 is formed from a first panel 14 which if laid flat would resemble a tailless airplane. The panel 14 has a rectangular body 15 and wings 16 and 17 extending to each side of the body 15, the leading edges, 18 and 19, respectively, of the wings 16 and 17, being swept back slightly and the entire panel 14 being folded at right angles along a line 20 bisecting the body 15 in the longitudinal direction. A second panel 21 having a rectangular section 22 joined along its long edge 23 by a fold line to a triangular section 24, is joined to the first panel 14 with the rectangular section 22 joining the outstretched ends of the wings 16 and 17. Here the connection is shown accomplished by riveting, but spot welding could be employed. The triangular section 24 is seen to provide a top wall closure for the resulting truncated right triangular prism.

A screw socket 25 for a bulb is mounted on the rectangular section 22 and extends in front of the junction box 13 angled downwardly as best seen in FIG. 5. The socket 25 is provided with the usual connecting wires 26 that pass through an opening in the section 22 into the interior of junction box 13.

As seen in FIGS. 3 and 5, the body section 15 is provided with a plurality of apertures 27 through which nails or screws can be passed for mounting the box 13 to the walls in a corner. The sides or wings 16 and 17 of the box 13 are provided with one or more knockouts, such as 28 shown in FIG. 5, for receiving a cable or conduit connector in the usual manner.

From FIG. 4 it will be seen that the box 13 is open at the bottom. A tab 29 extends from the lower edge 30 of the rectangular section 22 rearwardly, said tab being provided with a screw threaded aperture 31 for receiving a threaded fastener, shown at 36 in FIG. 2.

For the purpose of completing the junction box there is provided a triangular bottom wall panel 33 that is permanently joined to the rear walls of panel 12 along the lower edge 34 of a cut-out 35. The cut-out 35 is configured to receive the junction box 13 as best seen in FIG. 2, whereupon the screw fastener 36 can be installed through an aperture 37 (see FIG. 7) triangular panel 33 into the threaded aperture 31 in tab 29. This simultaneously closes the junction box and secures the lamp housing in position against the walls in the corner.

As seen in FIGS. 7 to 10, the rear fixture panel 12 has two truncated triangular side sections 38 and 39, orthogonally related and joined at the rear by a narrow web that provides a slight amount of clearance for general irregularities in the contour of the corner space in which the fixture is to be mounted.

Figure 10:
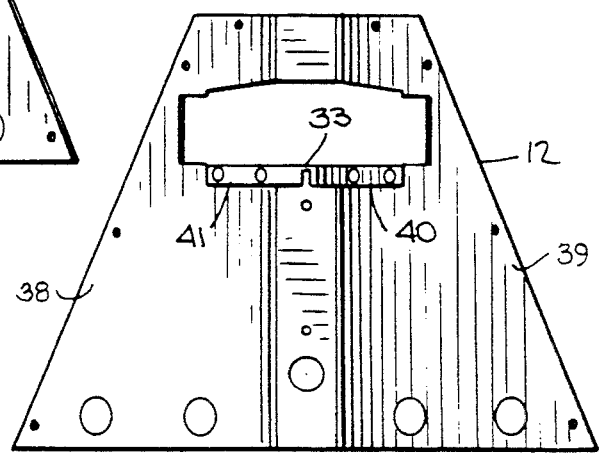
FIG. 10 is a rear elevational view of the structure of FIG. 7.
Figure 12:
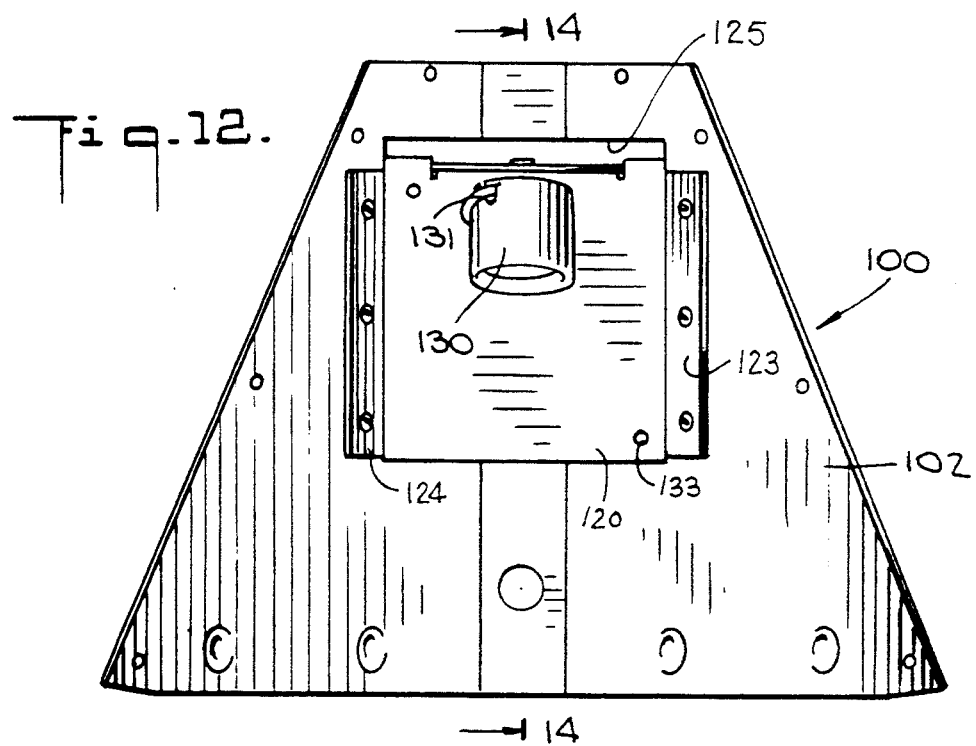
FIG. 12 is a front elevational view of a fixture similar to that shown in FIG. 1, but with the front decorative panels removed to reveal the front of the junction box and the lamp socket of another embodiment of the invention.

The triangular box panel 33 may be provided with flange extensions 40 and 41, best seen in FIG. 10, whereby the panel 33 is secured by rivets or spot welding to the panel 12. With this construction, one configuration of junction box can be used with a variety of lamp housings in which the front panels 11 change from model to model.

Installation is extremely simple. The branch cable is brought out of the wall in the corner of a room or space at the desired height. A junction box 13 is then connected to the cable 42 in any known manner and then located in the corner as shown schematically in FIG. 11. A few nails through the apertures 27 will secure the junction box in place. Appropriate wire connections to the lamp socket 25 will either already have been made or can be made within the box 13. It is now simply a matter of putting the lamp housing in place and installing the screw 36.

Referring to FIG. 4, the lower edge of wings 16 and 17 may be rolled over at 43 and 44 to provide added strength to wings 16 and 17 and provide a suitable seat for the cover panel 33.

Now turning to FIGS. 12 to 20, there is shown another embodiment of the present invention. As seen therein, the shade-like lamp housing is designated generally by the numeral 100 and consists essentially of a decorative front panel or panels similar to those shown in FIG. 1 but not shown herein, and a rear panel 102. As with the embodiment of FIG. 1, the front panel or panels can be joined to the side edges of the rear panel either by spot welding or riveting or in any other suitable manner.

The junction box for this embodiment is shown in detail in FIGS. 13, 18, 19 and 20, and is designated generally by the reference numeral 103. It is formed in the shape of an isosceles trapezoidal prism having top and bottom walls, 104 and 105, respectively, side walls 106 and 107, related orthogonally and joined at the rear by a back wall 108.

Figure 13:
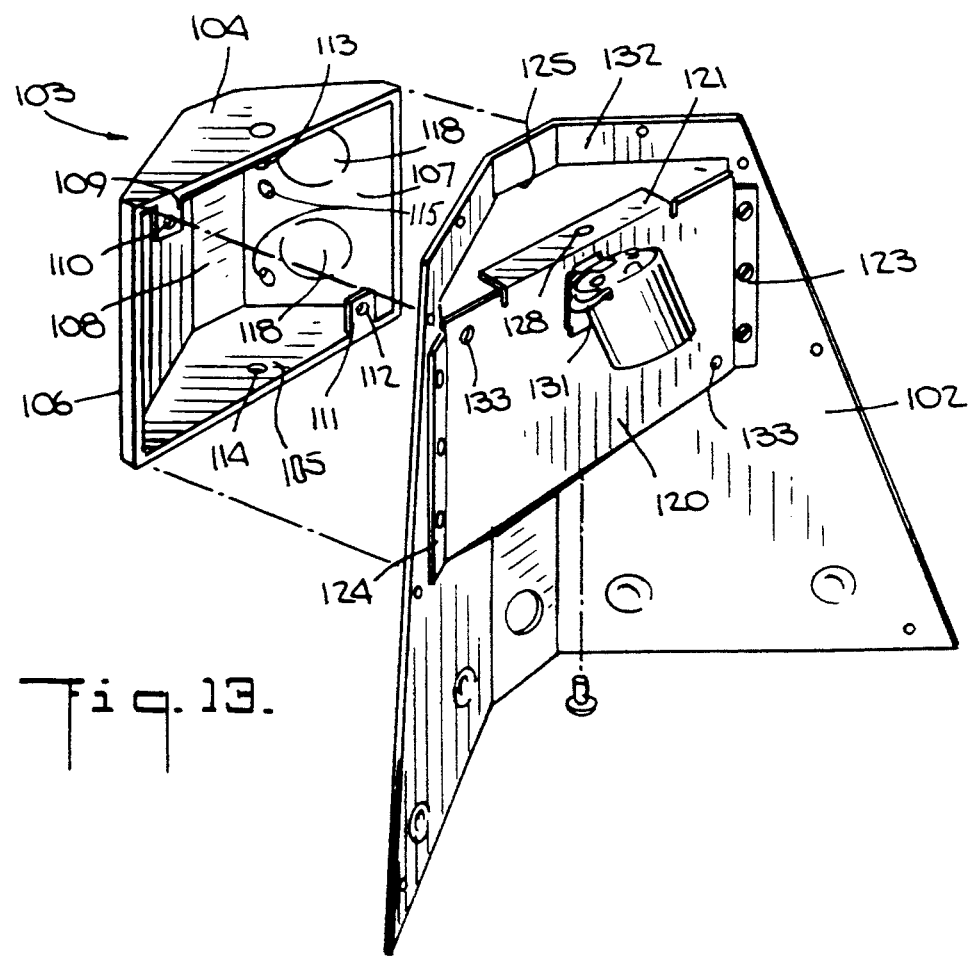
FIG. 13 is an exploded perspective view of the junction box and rear panel of the fixture as seen in the assembly of FIG. 12.
Figure 17:
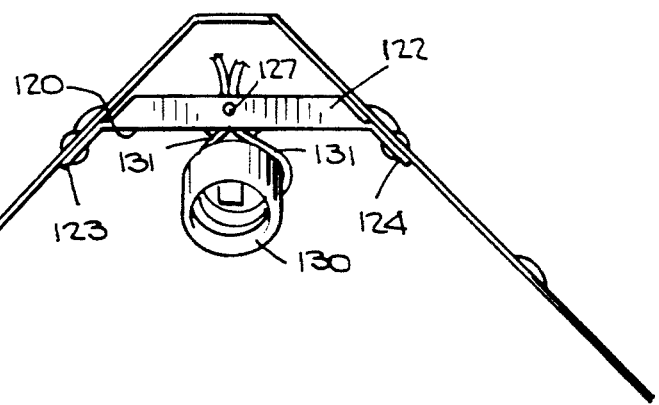
FIGS. 15, 16 and 17 are, respectively, rear elevational, top plan and bottom plan views of the rear panel of the fixture shown in FIG. 13.
Figure 15:
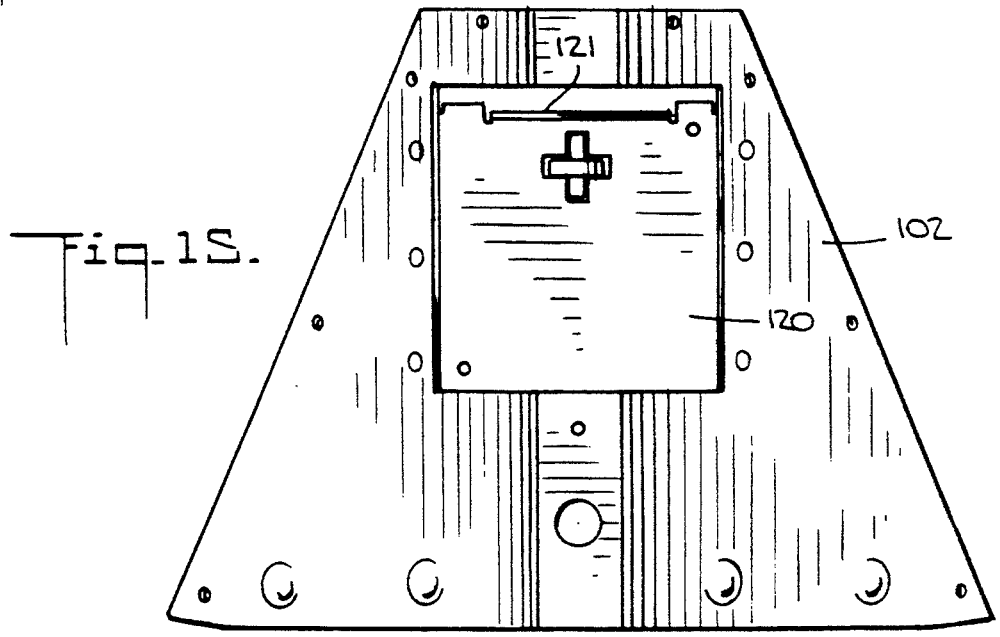
Figure 16:
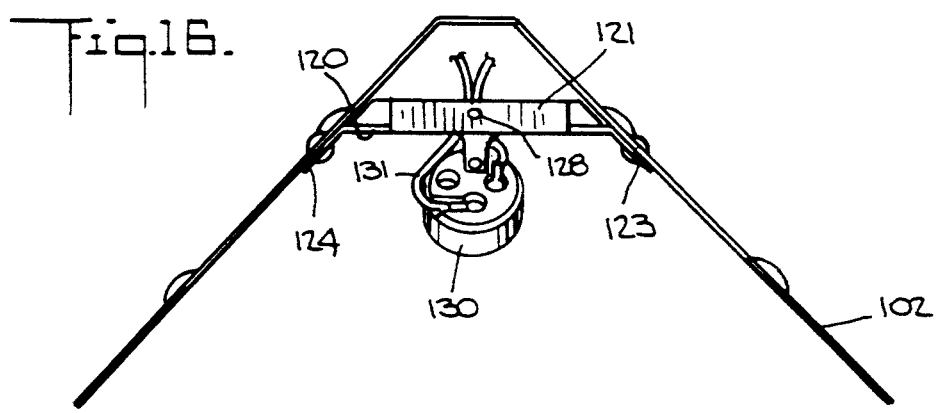

From the drawings it will be seen that the box 103 is open at the front. The top panel 104 has a downwardly depending tab 109 provided with a threaded aperture 110 while the bottom wall 105 has an upwardly extending tab 111 with a threaded aperture 112. Also, the top wall 104 has a stud or pin 113 secured therein toward the open edge of the wall 104 and projecting into the interior of the box. The lower wall 105 is provided with a threaded aperture 114. Also, as seen in FIGS. 13 and 18, the box 103 is provided with a plurality of apertures 115 through which nails or screws can be passed for mounting the box 103 to the room walls in a corner. The sides 106 and 107 of the box 103 are provided with one or more knockouts, such as that shown at 118 in FIG. 18, for receiving a cable or conduit connector in the usual manner. If desired, the top and bottom walls can be provided with a polygonal knockout such as that shown at 119 in FIG. 19. This knockout is of the type to accommodate surface mounting conduit, if desired.

The junction box 103 as described to this point is an open box requiring a cover. The cover is in the form of a substantially rectangular shaped panel 120 having top and bottom rearwardly directed flanges 121 and 122 and side edge flanges 123 and 124. The flanges 123 and 124 are angled from the panel 120 at a 45° angle and serve to join the wall 120 to the rear wall or panel 102 of the fixture. That is, the front wall 120 of the junction box is permanently joined to the rear walls of panel 102 on either side of a cutout 125. The cutout 125 is configured to receive the junction box 103, as best seen in FIG. 14, whereupon a screw fastener 126 (see FIG. 14) can be installed through an aperture 127 in the flange 122 (see FIG. 17) into the threaded aperture 114 in the bottom wall 105 of the junction box. The pin or stud 113 of the junction box is engaged in an aperture 128 in the upper flange 121. With the front wall 120 thus secured to the main body of the junction box 103 the box is simultaneously closed and the lamp housing is secured in position against the walls of the room in the corner.

A screw socket 130 for a bulb is mounted on the rectangular wall 120 and extends in front of the junction box 103 angled downwardly as best seen in FIGS. 13 and 14. The socket 130 is provided with the usual connecting wires 131 that pass through an opening in the wall 120 to the rear thereof for disposition into the interior of junction box 103.

To install the box and fixture shown in FIGS. 12 to 20, a branch cable is brought out of the wall in the corner of a room or space at the desired height as with the first embodiment shown in FIG. 11. The junction box 103 is then connected to the cable 42 in any known manner and then located in the corner in the same way as the box 13 in FIG. 11. A few nails through the apertures 115 will secure the junction box in place. Now the lamp fixture can be hung or suspended temporarily from the box 103 by passing the upper section 132 of the rear panel 102 over and behind the tab 111. With the fixture thus suspended, the wires 131 can be connected within the junction box 103 to the incoming wires from cable 42 in the usual manner. Thereupon, the opening 125 in the fixture can be fitted over the junction box 103 with the pin 113 being engaged in aperture 128 and the screw fastener 126 being inserted. Alternatively, or as a supplemental fastening, screws can be passed through the front apertures 133 in the wall 120 into the apertures 110 and 112 in the tabs 109 and 111.

As clearly seen in FIG. 14, the junction box 103 has a height substantially equal to the distance between the flanges 121 and 122 such that the top and bottom walls 104 and 105 of the junction box, when assembled to the removable wall 120, overlie the flanges 121 and 122, as shown.

Figure 21:
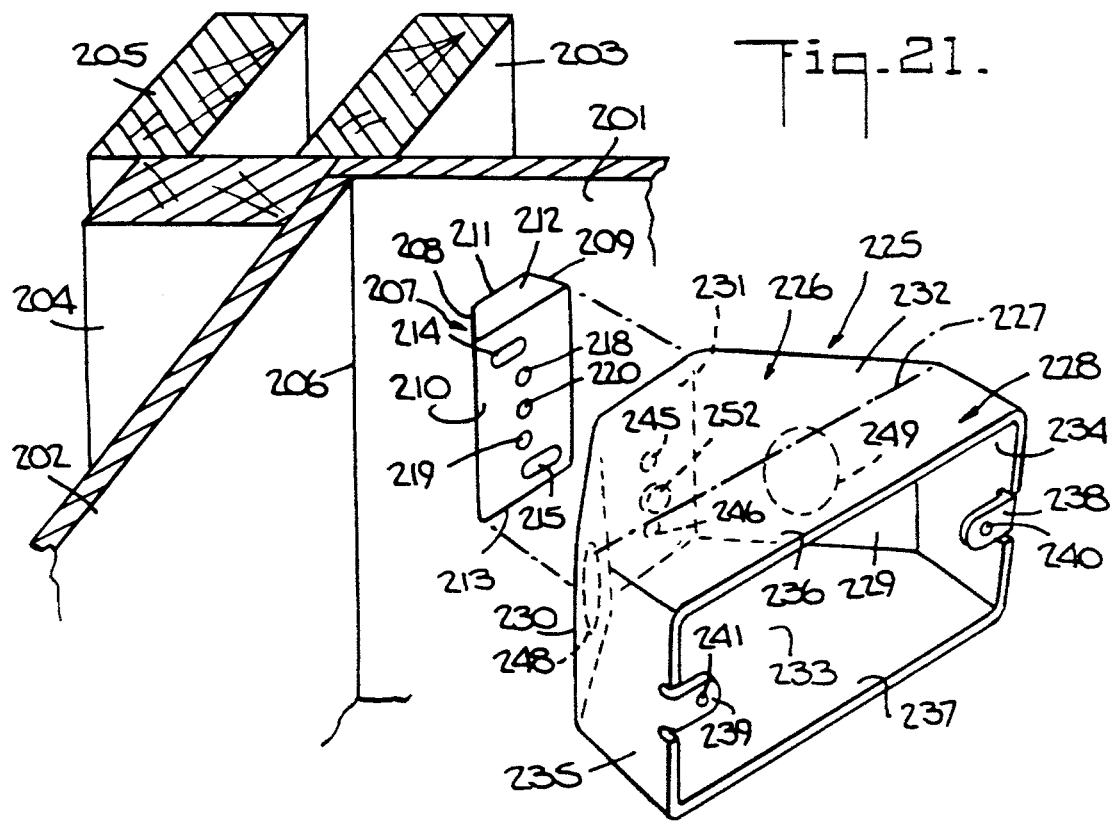
FIG. 21 is an exploded perspective view showing a modification of the junction box of FIG. 18, and one embodiment of an adapter for mounting the junction box.
Figure 22:
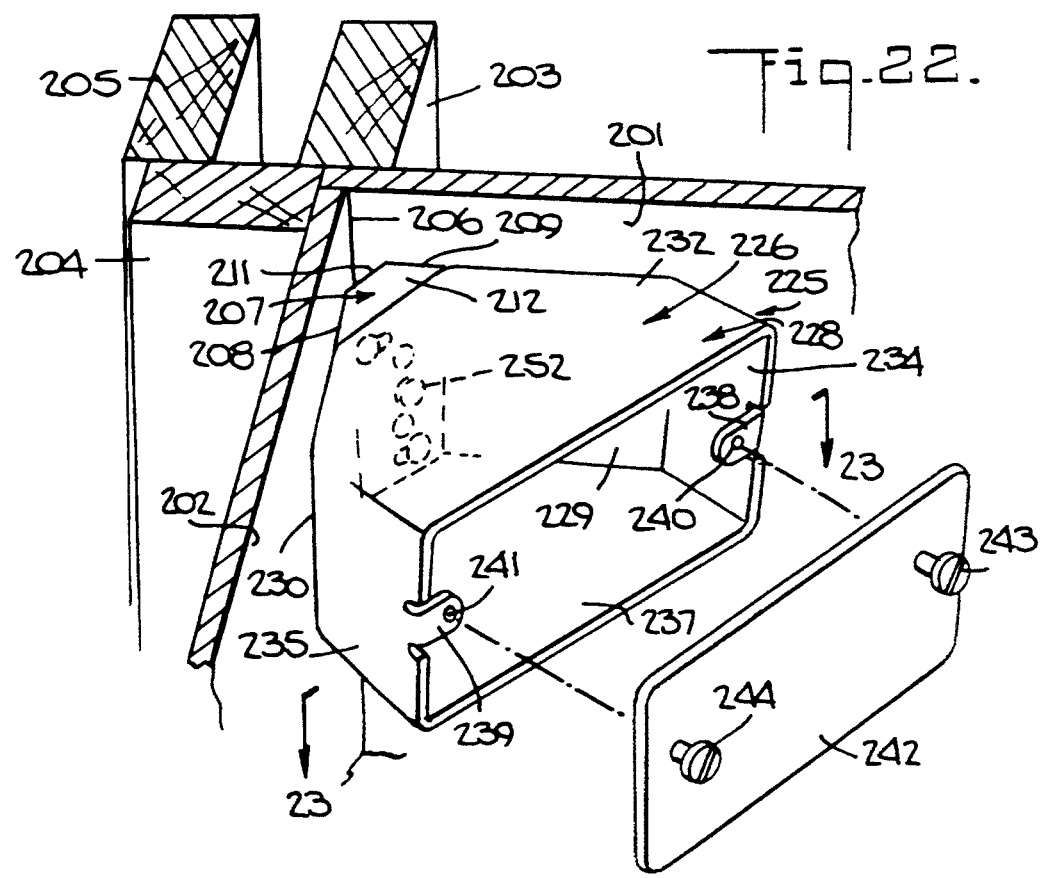
FIG. 22 is a view similar to FIG. 21, but with the box and adapter joined to the studs in the corner of a room, and a cover plate in exploded relation thereto.
Figure 23:
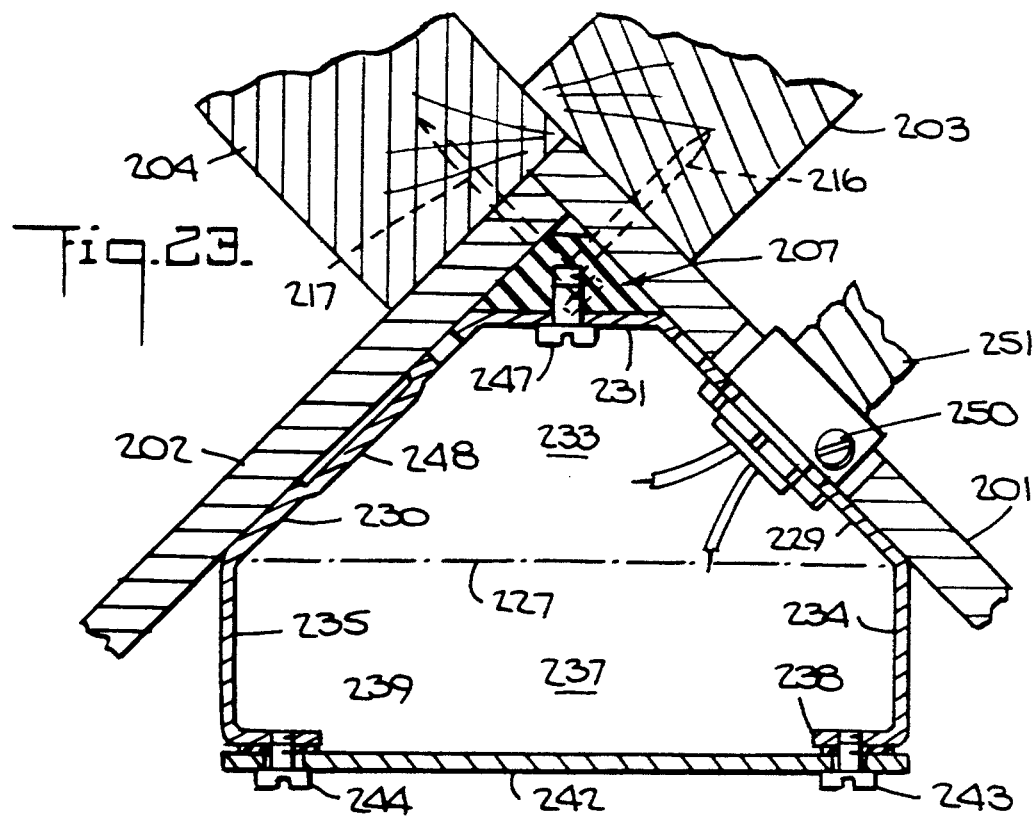
FIG. 23 is a transverse sectional view taken along the line 23—23 in FIG. 22, and showing the connection to the junction box of an electric cable.

Reference should now be had to FIGS. 21 to 23. For the purpose of illustrating a typical environment encountered in the corner of a room, the drawings show intersecting walls, 201 and 202, secured to corner studs 203, 204 and 205. The stud arrangement is typical in that only a narrow vertical strip of wall immediately adjacent a corner 206 is backed by a stud. The construction of the novel adapter 207 is such as to enable it to be fastened in the corner 206 by nails or screws passing into either the stud 203 or 204.

The adapter 207 is in the form of an isosceles trapezoidal prism having side walls 208 and 209, a wide front wall 210 and a narrow rear wall 211 parallel to the front wall 210, with top and bottom walls 212 and 213. The walls 212 and 213 can be parallel or non-parallel, planar or non-planar to suit the contours of the box or device to be fastened thereto.

As seen from FIGS. 21 and 23, the adapter 207 is provided with two through bores, 214 and 215, which enter the front wall 210 at an angle, and pass through to the opposite side wall 209 and 208, respectively. The side walls 208 and 209 are orthogonally related so as to fit snugly against the room walls 202 and 201, respectively, when the adapter is fastened in the room corner 206. This is best seen in FIG. 23. When so fastened, the wall 210 will be positioned catercorner symmetrically about the corner bisecting plane. The bore 214 is preferably parallel to wall 208 and therefore normal to wall 209. Conversely, bore 215 is parallel to wall 209 and normal to wall 208. The adapter is dimensioned relative to the normal stud construction somewhat as shown in FIG. 23 such that nails or screws 216 and 217 will enter either stud 203 or stud 204 to firmly secure the adapter 207 in the corner 206.

Finally, the adapter 207 is provided with two threaded bores 218 and 219 located in wall 210 normal thereto, and with a clearance or locating bore 220.

As shown in FIGS. 21–23, a junction box 225 has a rear section 226 behind the phantom line 227 in the form of a right isosceles trapezoidal prism to which is integrally joined a front section 228 in the form of a right rectangular prism. Thus, the section 226 has orthogonally related side walls 229 and 230, a rear wall 231, an imaginary front boundary at the line 227, and top and bottom wall segments 232 and 233. The section 228 has parallel side walls 234 and 235 extending from the side walls 229 and 230, respectively, and top and bottom parallel wall segments 236 and 237. The front of the box 225 is normally open and provided with opposite tabs 238 and 239 which each contain a threaded aperture 240, 241. The front of box 225 both as to rectangular shape and size as well as tab construction can be conventional such as to be closed, as shown in FIG. 22, by a conventional cover plate 242 with the aid of screws 243 and 244.

In order to attach box 225 to adapter 207, the rear wall 231 is provided with two apertures 245 and 246 intended to register with the bores 218 and 219 in adapter 207 when walls 231 and 210 are brought into engagement. It should be apparent that walls 210 and 231 as shown in the drawings are substantially congruent. This is important in the width dimension but may be varied in the vertical dimension. Suitable screws such as 247 seen in FIG. 23, are used to join box 225 to adapter 207.

As shown in FIG. 21, knockouts 248 and 249 are provided in side walls 229 and 230. In FIG. 23, the knockout 249 has been removed and a cable connector 250 of conventional construction installed in the resulting aperture. During assembly, similar to FIG. 11, the cable 251 is first brought out of the wall and connected to box 225. Then the box 225 is set in place, snug in the corner, and fastened to adapter 207, already in place.

The box 225 is preferably provided with a grounding connection in the form of a screw 252 threaded through the back wall 231 midway between the apertures 245 and 246 in line with the latter. Besides functioning as an attachment for the conventional grounding wires, the screw 252 projects beyond the rear wall 231 and functions as a locating pin upon entering the bore 220 in adapter 207.

The junction box 225 is sized with a conventional forward section 228 adapted to receive standard electrical devices such as sockets and the like and standard cover plates.

Figure 24:
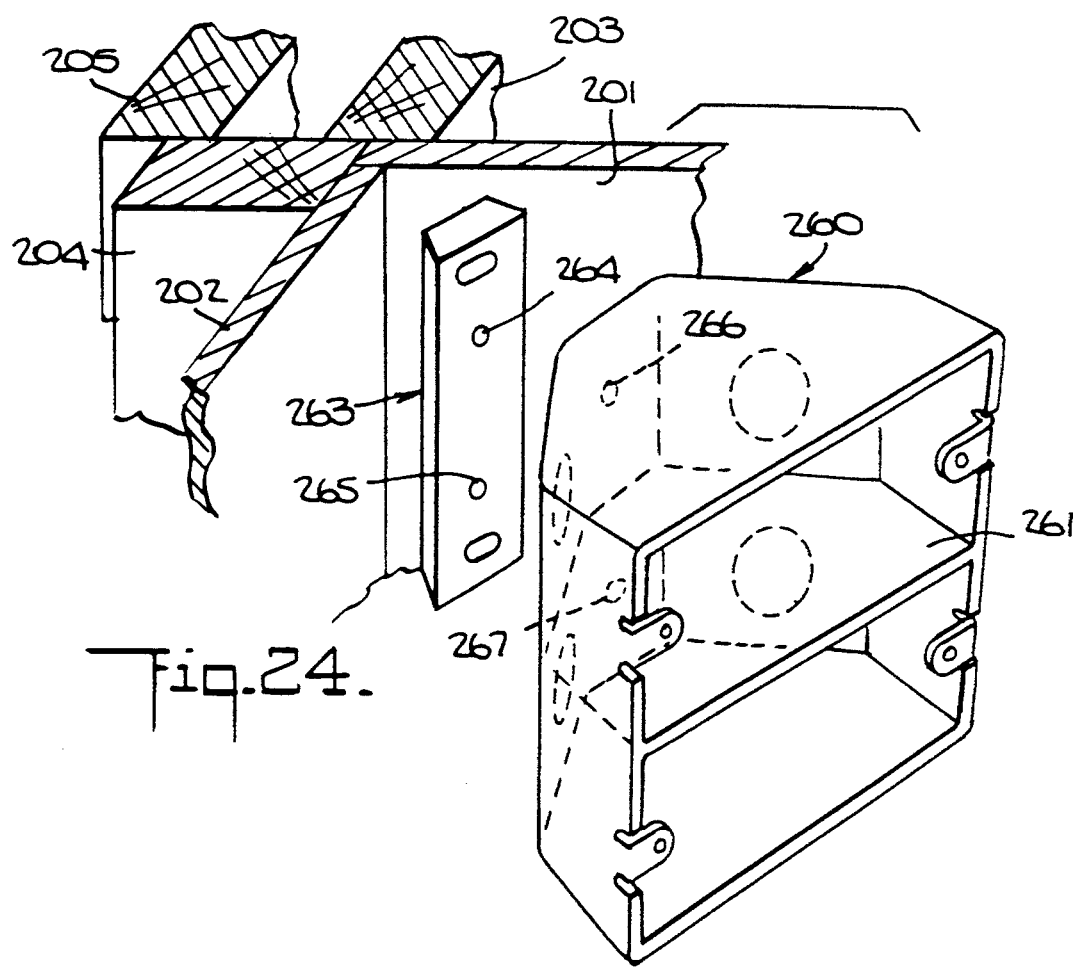
FIG. 24 is a view similar to FIG. 21 showing a duplex or double compartment junction box as a modification of the box of FIG. 21.

When a duplex arrangement is desired, a box such as the box 260 in FIG. 24 can be employed. Essentially, the box 260 is equivalent to two boxes 225 stacked one above the other but with a common dividing wall 261. Wall 261 can be omitted if desired. The transverse shape of box 260 is the same as that of box 225. Box 260 is used with an adapter 263 which, it should be apparent, is an elongated version of adapter 207. Threaded bores 264 and 265 in adapter 263 receive screws (not shown) passed through apertures 266 and 267 in the rear wall of box 260. While adapter 263 does not have a bore similar to the bore 220 in adapter 207, a bore can be provided if desired or necessary to accommodate a grounding screw such as the screw 252 in FIG. 21.

Various shape junction boxes or wiring devices can be mounted in a room corner using an adapter such as 207 or 263. An example of an octagonal box is shown in FIGS. 25 and 26, where the box is designated generally by the reference numeral 270. As with the boxes 225 and 260, the box 270 has a rear portion or segment which in transverse cross-section has an isosceles trapezoidal shape to which is joined a front segment of rectangular shape. As seen in top plan view in FIG. 26 the box 270 has rear side walls 271 and 272 that are orthogonally related. These are the non-parallel walls of the trapezoidal segment. The small wall of the trapezoidal segment is the rear wall 273 provided with apertures 274 and 275 as well as grounding screw 276, corresponding, respectively, to the elements 245, 246 and 252 of FIG. 21. For both functional and aesthetic reasons the walls 277, 278, 279 and 280 are planar and alternate with curved walls 281, 282, 283 and 284. Tabs 285 and 286 are provided at standard spacing such that standard cover plates and other electrical devices can be mounted thereon. Knockouts 287 and 288 are provided for bringing in cable or conduit connections.

The embodiments shown in FIGS. 21 to 26 all make use of an adapter in the form of an isosceles trapezoidal prism. However, it may be preferable to fabricate the adapter from metal sheet stock, examples of which are shown in FIGS. 27 to 30 to which attention should now be directed. For convenience, only one size and shape junction box is illustrated in these figures. The box is designated generally by the reference numeral 290 in FIG. 27 and 300 in FIG. 29. They differ from the box 225 in FIG. 21 solely in the construction of the rear wall 291 in FIG. 27 and 301 in FIG. 29. Therefore, the description of the remainder of the boxes will not be repeated.

Referring now to FIG. 27, the mounting system shown therein employs an adapter designated generally by the reference numeral 292 which is formed from a strip of metal sheet stock into a generally right triangular configuration but with the right angled corner at 293 missing such that the perimeter of the adapter 292 has the shape of an isosceles trapezoid with the smaller parallel side missing. The widest parallel side or base 294 of the triangle has a horizontally disposed slot 295 when the adapter 292 is placed in a vertical corner of a room. Each of the non-parallel sides 296 and 297 of the adapter 292 have a respective aperture, such as the aperture 298 in side 296. The side 297 is a mirror image of the side 296 and has a similar aperture although not seen in the drawing. The aperture 298 in side 296 as well as the aperture in side 297 are located on a level with and accessible through the slot 295 for driving fasteners, for example, the nails 299 and 305, through the respective aperture into a corner wall stud. The widest parallel side, that is the side 294 of the adapter is provided with means for enabling a junction box or other wiring device to be fastened contiguous thereto. As illustrated in FIG. 27, the side 294 has a tab 306 struck therefrom as shown and provided with an aperture 307.

Figure 28:
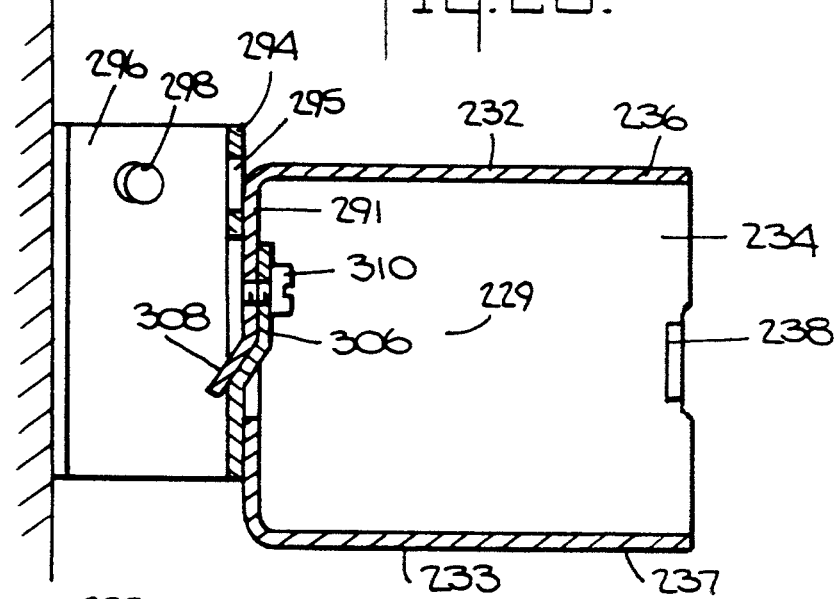
FIG. 28 is a vertical sectional view taken along the line 28—28 through the components of FIG. 27, with the components in assembled relationship fastened in the room corner.

The rear panel 291 of the junction box 290 is provided with a complemental tab 308 which overlaps the tab 306 in the bracket when the junction box 290 is assembled thereto as best seen in FIG. 28. When so assembled a threaded aperture 309 in the wall 291 comes into registration with the aperture 307 in the tab 306 of the adapter 292 to enable a fastener such as a suitable screw 310 to be inserted through aperture 307 in tab 306 into the threaded aperture 309 in the box wall 291 which upon assembly is behind tab 306, all as shown in FIG. 28.

Figure 29:
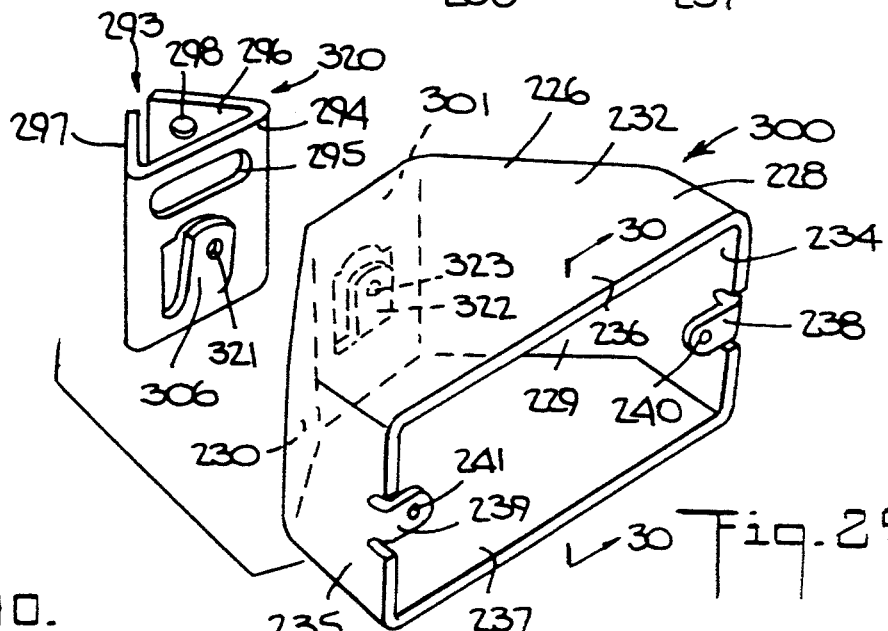
FIG. 29 is a view similar to FIG. 27, showing a modification of the junction box relating to the means for fastening the junction box to the adapter.
Figure 30:
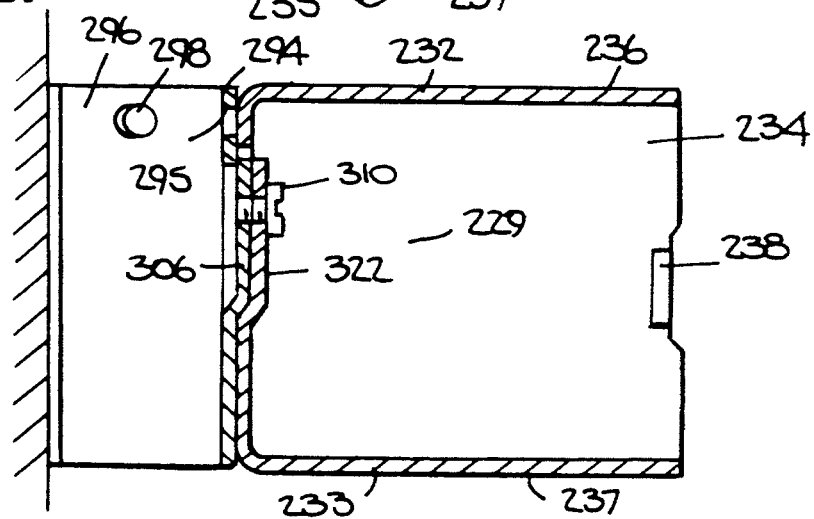
FIG. 30 is a vertical sectional view taken along the line 30—30 through the components of FIG. 29, with the components in assembled relationship fastened in the room corner.

A reverse construction is illustrated in the embodiment of FIGS. 29 and 30. As shown therein the adapter 320, essentially identical to the adapter 292 but differing therefrom in that the aperture 321 in tab 306 is now tapped rather than a mere through opening. The rear wall 301 of the junction box 300 has a tab 322 struck therefrom in a manner opposite to that found in the box 290 of FIG. 27. That is, as seen in FIG. 27 the tab 308 is disposed downwardly whereas in the embodiment of FIG. 29 the tab 322 extends upwardly and is provided with an unthreaded aperture 323. When the box is assembled to the adapter as shown in FIG. 30 a screw 310 passes through the aperture 323 in tab 322 and threads into the aperture 321 in tab 306 to fasten the box to the adapter.

The general concept illustrated with reference to FIGS. 1 to 30 can be extended further in the manner to be described with reference to FIGS. 31–39 wherein the corner adapter is combined with pre-existing wiring devices where because of the presence of low voltages a completely enclosed junction box is not required. The various embodiments shown in FIGS. 31–39 contain telephone jack devices. However, it should become apparent that the principles can be extended to other devices including but not limited to television cable jacks, infrared or ultrasonic surveillance devices, and the like.

Referring first to FIGS. 31 and 32 there is shown a solid prism 350 substantially of isosceles trapezoidal configuration similar to adapter 207 in FIG. 21 but differing therefrom principally in the configuration of the rear wall 351 which, instead of being flat, is concave. To the extent that the adapter 350 is similar to adapter 207, the same reference numerals are used. A bore 352 is provided which extends completely through the prism to serve as a passage through which a telephone line (not shown) can be passed. The prism adapter 350 is constructed for mounting in the corner of a room the same as adapter 207.

Next, an adapter plate 353 is provided for attachment to the adapter 350. The plate 353 has a flat rear section 354 provided with apertures 355, 356 and 357 that register, respectively, with tapped openings 218 and 219 and through bore 352 of the corner adapter 350. In addition, parallel flanges 358 and 359 are formed by reentrantly folded side sections of the plate 353.

The plate 353 is provided for accommodating attachment of the conventional modular jack backplate 360. Apertures 361 are provided in four corners of the plate 353, formed in the flanges 358 and 359, for receiving either self-tapping screws or, if the apertures 361 are tapped, machine screws, passed through the inclined slots 362 in backplate 360. The spacing of flanges 358 and 359 from the back section 354 of adapter 353 serves to provide clearance for accommodating rearward protrusion of parts of the backplate 360. Also, from a structural standpoint, the metal plate 353 provides a strong anchor for the screws used to secure the backplate 360, whereas threading such screw directly into the corner adapter 350, because of their location proximate to the side edges of the prismatic body, would not produce a strong connection. The assembly of FIG. 31 is completed with a conventional telephone mounting faceplate 363.

The assembly shown in FIGS. 31 and 32 is used when it is desired to install a telephone directly in the corner of a room. First the corner adapter 350 is mounted in the corner by passing screws or nails through apertures 214 and 215. It is assumed that the necessary telephone wiring has been previously installed and is brought outward through bore 352 prior to attaching adapter 350 to the walls.

Next, suitable screws, not shown, are passed through apertures 355 and 356 into holes 218 and 219 to fasten plate 353 to adapter 350, it being understood that the telephone wiring from bore 352 is passed though aperture 357. The telephone wiring is there passed through backplate 360 which is now fastened by a set of screws, not shown, passed through slots 362 into apertures 361. Appropriate connections are established to the jack 364 in backplate 360, whereupon screws are passed through the apertures 365 into threaded holes 366 to secure the faceplate 363 to the backplate.

Figure 33:
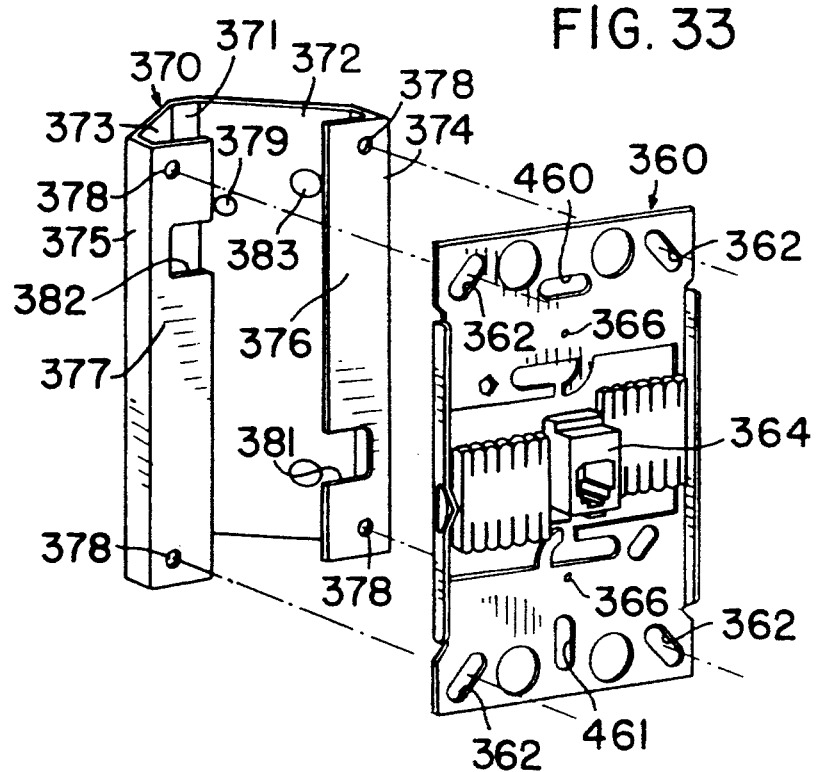
FIG. 33 is an exploded perspective view illustrating another form of corner adapter for mounting a telephone jack backplate.
Figure 34:
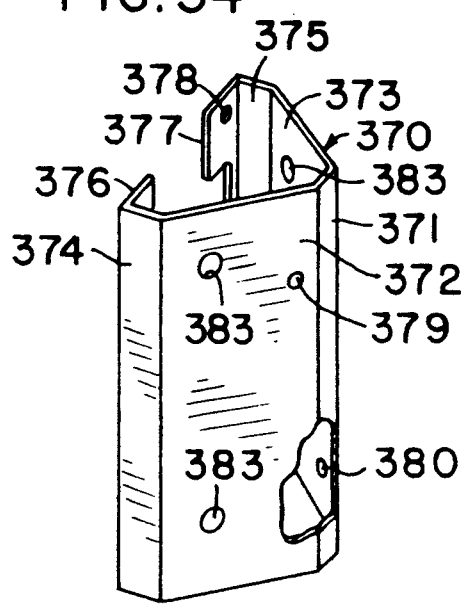
FIG. 34 is a rear perspective view of the corner adapter of FIG. 33.

An alternative construction to that shown in FIG. 31 is illustrated in FIGS. 33 and 34. A corner adapter 370 is formed from sheet metal to take the place of the two components, 350 and 353, of FIG. 31. The adapter 370 consists of a narrow rear wall 371 to which is joined side walls 372 and 373, orthogonally related, and to which are joined facing wall sections 374 and 375 terminating in flange portions 376 and 377. The flange portions 376 and 377 are provided with screw receiving apertures 378, similar to the apertures 361 in the plate 353 of FIG. 31. Apertures 379 and 380 are provided, respectively, in the side walls 372 and 373 through which screw fasteners can be inserted into the room walls. Notches 381 and 382 are provided in flange portions 376 and 377 through which access is provided to apertures 380 and 379. As seen in FIG. 33, the modular jack backplate 360 can be secured to the adapter 370 in the same manner as previously described with reference to FIG. 31. Finally, the adapter 370 is provided with a series of knockouts 383 through which the telephone wire or cable can be introduced.

Figure 35:
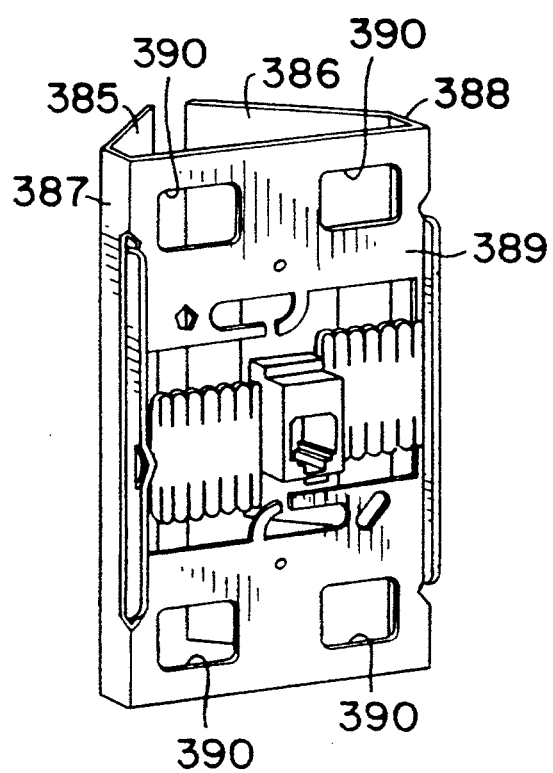
FIG. 35 is a perspective view of another embodiment wherein the corner adapter is formed integral with the telephone jack backplate.
Figure 36:
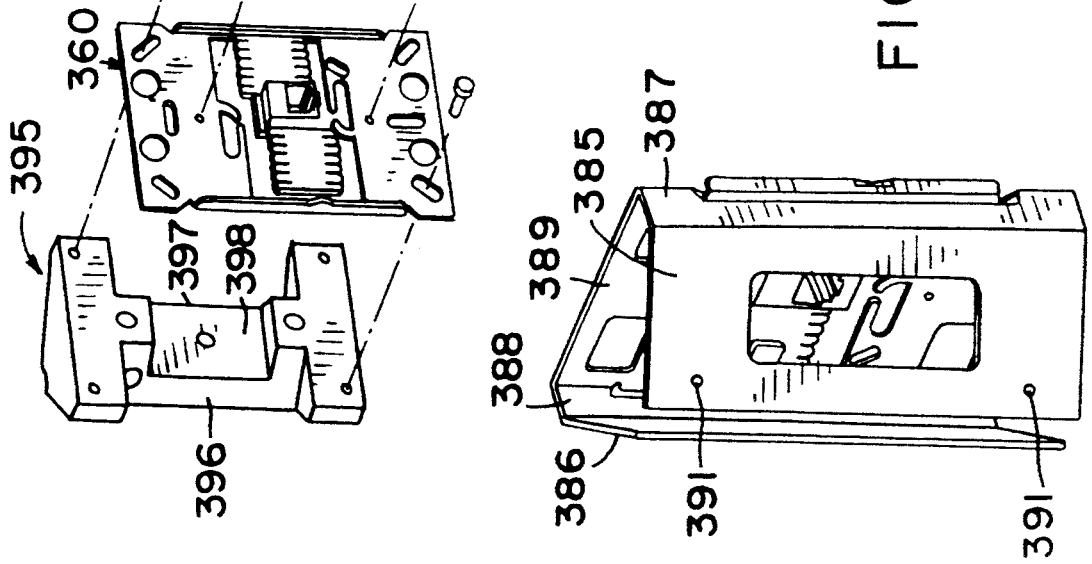
FIG. 36 is a rear perspective view of the embodiment of FIG. 35.

A further reduction in the number of parts can be achieved with the embodiment of FIGS. 35 and 36 wherein the modular jack backplate is formed integral with the structure for mounting it in the corner of a room. Two orthogonally related panels 385 and 386 are joined by narrow webs 387 and 388 to a backplate portion 389. By comparing FIG. 35 with FIG. 33 it will be appreciated that the top and bottom areas are modified eliminating the circular and oblong apertures of FIG. 33 and substituting the rectangular openings 390 which provide access to the apertures 391 through which mounting screws can be passed. The structure in FIGS. 35 and 36 can take the place of elements 350, 353 and 360 of FIG. 31.

Figure 37:
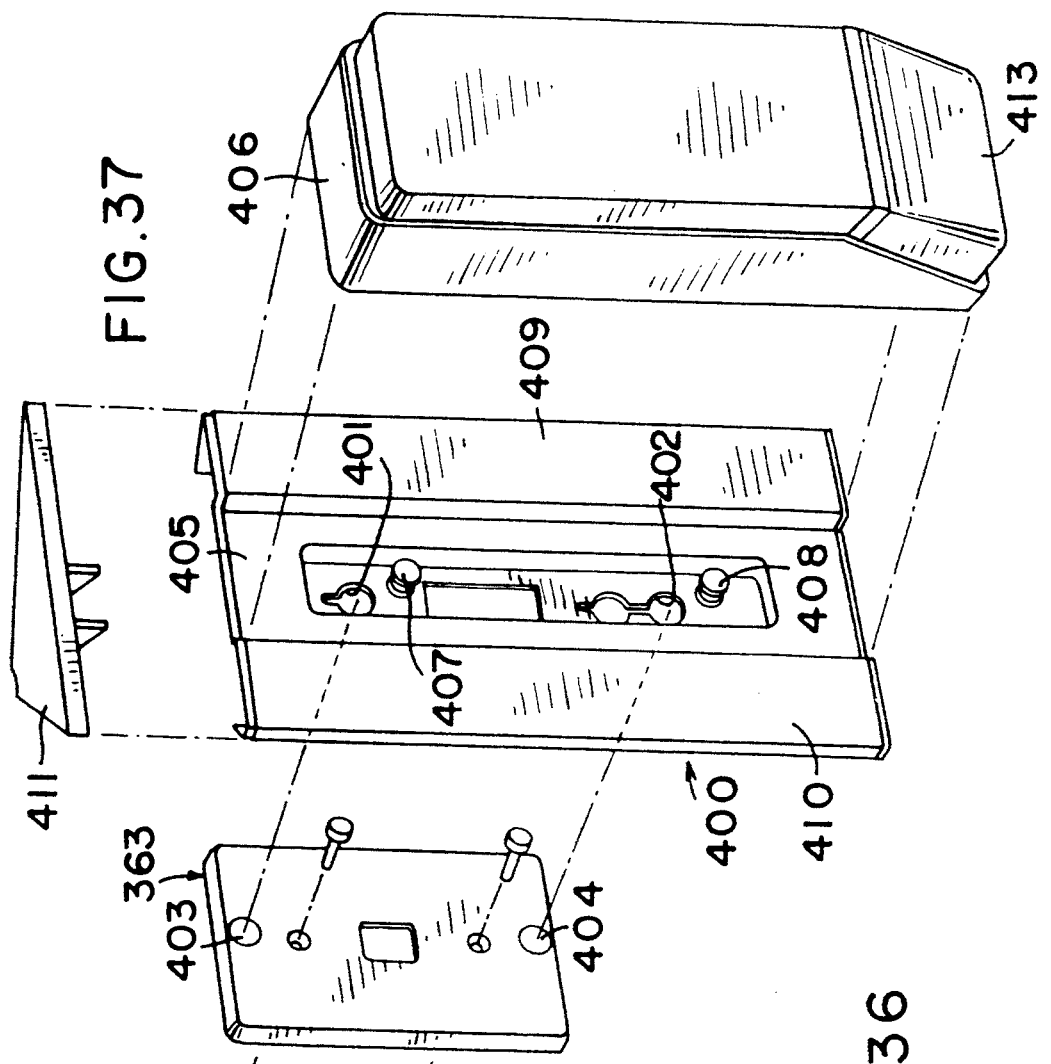
FIG. 37 is an exploded view similar to FIG. 31 but illustrating an assembly consisting of another embodiment of the corner adapter, a special backboard or escutcheon, and a wall mountable telephone instrument.

Attention should now be directed to FIGS. 37, 38, and 39. In this embodiment the corner adapter 395 is modified, as shown, in order that the conventional modular jack backplate 360 can be fastened directly to the adapter 395. The backplate 360 and faceplate 363 are the same as those found in FIG. 31. As seen in FIGS. 37 and 39 the adapter 395 has a rear portion similar to the rear of adapter 350, however, a major portion on each side is removed to provide the notched portions 396 and 397. The front of the prismatic structure is extended forward thereby taking on the function of the plate 353 of FIG. 31 with a further notch 398 introduced to provide clearance for the structure forming a part of the backplate 360. The assembly of faceplate 363, backplate 360 and adapter 395 should be readily apparent.

For purpose of illustration, a typical telephone assembly is shown in FIG. 37. A backboard 400 is provided for assembly to the faceplate 363. The backboard 400 is provided with keyhole slots 401 and 402 for mating with pins 403 and 404 on faceplate 363. The backboard 400 is configured over a central portion 405 to receive the base unit 406 of a wall mountable telephone instrument, pins 407 and 408 providing the conventional attaching means. The central vertical portion 405 of the backboard 400 is bordered by wings 409 and 410 that function somewhat as an escutcheon and cooperate with a top and bottom panel, 411 and 412, to conceal the mounting and wiring components 395, 360 and 363. The wings 409 and 410 can be ornamented as desired and need not be planar as shown in the illustrative figure. A telephone handset 413 cooperates with the base 406 in the usual manner.

Reference now should be had to FIGS. 40 and 41 showing a corner mountable junction box 450 having an external configuration similar to that of the adapter in FIG. 33. Pierced ears 451, 452, 453 and 454 are provided projecting longitudinally from the top and bottom of the box 450 for receiving fasteners such as screws or the like to secure the box in a corner of a room. Lugs 455 and 456, containing suitable threaded apertures 457 and 458, provide for attaching various components directly to the box 450. For example, a backplate 360 could be attached to the box 450 using the slots 460 and 461 (see FIG. 33). Knockouts 462 are provided in the walls of the box 450 similar to the knockout 383 in FIGS. 33 and 34.

Turning now to FIGS. 42 and 43, there is shown an embodiment in which a modular jack is adapted for installation in a corner. The jack box consists of the base section 475 and the closure section 476, the latter containing the jack 477. The base section 475 has a prismatic body 478, similar to the blocks 350 in FIG. 31, to which are joined orthogonally related side panels 479 and 480 containing knockouts such as 481 and 482. Also joined to the body 478 are four terminal posts 483, 484, 485 and 486 with binding screws 487, 488, 489 and 490. Bores for receiving screws to secure the base section 475 in a room corner are shown at 491 and 492, while a wire passage bore is shown at 493. A post 494 with a threaded bore is provided for receiving the screw 495 for attaching to the base section 475 the closure section 476. The closure section 476 has a configuration and construction which, with front panel 496 and top and bottom panels 497 and 498, when assembled to base section 475, cooperates with the side panels 479 and 480 and the wall 499 to provide an enclosure having an isosceles trapezoidal cross-section.

During installation a telephone cable is brought through the passage or bore 493 and is prewired to the posts 483–486 in the customary Red, green, yellow and black pattern. The terminal lugs 500 wired to jack 477 are connected in known manner to the corresponding posts 483–486, and the closure section 476 is then secured to the base section 475.

While FIG. 43 shows a single jack, it should be apparent that additional jacks in any desired combination can be provided. Also, double sided adhesive tape or the like applied to the orthogonally related walls can be used to mount the jack box or housing in the room corner either instead of or supplementary to the use of screws in the bores 491 and 492.

Having described the invention with reference to the presently preferred embodiments thereof, it will be apparent to those skilled in the subject art that numerous changes in construction and detail can be introduced without departing from the true spirit of the invention as defined in the appended claims.

What is claimed is:

1. An electrical junction box for permanent installation in a corner of a room between two intersecting walls, said junction box having rear walls including orthogonally related portions shaped to fit snugly in said corner while positioning the junction box symmetrically about the corner bisecting plane, means including apertures in said orthogonally related portions for enabling said junction box to be fastened symmetrically about said bisecting plane to said intersecting walls in said corner by passing fasteners through said apertures into said walls, said apertures being located to overly the room corner studs, entry means on said junction box for admitting electric wiring and securing such wiring against separating from said junction box, said junction box having side walls that terminate in straight edges bounding an opening to the junction box and lying in a common plane which plane is located catercorner to said intersecting walls of the room when said junction box is fastened in said corner, and means for securing to said straight edges means for closing said junction box.

2. A surface mountable telephone jack for mounting in a corner of a room between two intersecting walls, comprising a jack housing having walls shaped to fit snugly in said corner while positioning the housing symmetrically about the corner bisecting plane, entry means on said housing for admitting electric wiring, and a telephone jack mounted in said housing and accessible from the exterior thereof.

3. A surface mountable jack according to claim 2, wherein at least the rear portion of said housing has orthogonally related side walls that engage said room corner walls when the housing is mounted in said corner, and adhesive elements are secured to the exterior surfaces of said orthogonally related walls for bonding to said room corner walls to secure said jack in place.

4. A mounting system for mounting electrical wiring devices in a corner of a room between two intersecting walls, comprising a mounting adapter having a cross-section configured and dimensioned to fit in said room corner between said corner and said devices and having a surface which when the adapter is mounted in said room corner is positioned catercorner to said intersecting walls to which a rear wall of said devices can be securely fastened for positioning said devices symmetrically about the corner bisecting plane catercorner to said intersecting walls, said adapter being in the form of a solid isosceles trapezoidal prism having means for receiving fasteners in one or more locations in sufficient proximity to the room corner for securing the adapter to room corner studs and having its non-parallel opposing sides orthogonally related, and the widest of its parallel sides provided with means for enabling one of said devices to be attached contiguous thereto.

5. A mounting system according to claim 4, wherein said means for receiving fasteners comprise at least one through bore extending between one of said orthogonally related sides and the widest of the parallel sides.

6. A mounting system according to claim 6, wherein said widest of the parallel sides has at least one threaded bore for receiving a threaded fastener for securing said device thereto.

7. A mounting system according to claim 5, wherein a plurality of said through bores are provided with some opening on one and some opening on the other of said orthogonally related sides while all open on said widest of the parallel sides.

8. A mounting system according to claim 7, wherein said widest of the parallel sides has at least one threaded bore for receiving a threaded fastener for securing said device thereto.

9. A mounting system for mounting an electrical component in a corner of a room between two intersecting walls, comprising mounting adapter means having an outer perimeter configured and dimensioned to fit in said room corner between said corner and said component, said mounting adapter means having means for receiving fasteners in one or more locations in sufficient proximity to the room corner for securing the adapter means to room corner studs, the construction of said mounting adapter means and said component being such as to provide tool access for driving said fasteners and for positioning said component catercorner to said intersecting walls substantially symmetrically about the corner bisecting plane, said adapter means being in the form of a solid isosceles trapezoidal prism with the non-parallel opposing sides orthogonally related, and the widest of the parallel sides provided with means for enabling one of said components to be attached contiguous thereto.

10. A mounting system for mounting an electrical component in a corner of a room between two intersecting walls, comprising mounting adapter means having an outer perimeter configured and dimensioned to fit in said room corner between said corner and said component, said mounting adapter means having means for receiving fasteners in one or more locations in sufficient proximity to the room corner for securing the adapter means to room corner studs, the construction of said mounting adapter means and said component being such as to provide tool access for driving said fasteners and for positioning said component catercorner to said intersecting walls substantially symmetrically about the corner bisecting plane, said adapter means comprising an element formed from metallic sheet stock having a relatively narrow rectangular rear panel from each lateral margin of which extends a broader rectangular side panel, which side panels connect, respectively, with a corresponding additional narrow rectangular panel and then with a reentrantly directed flange, said side panels being orthogonally related and of the same size, said additional rectangular panels being positioned in parallel, and said flanges lying in a common plane, said flanges including means for receiving means for securing said component thereto, each of said side panels having at least one aperture through which a fastener can be passed.

11. A mounting system according to claim 10, wherein an opening is provided in each of said flanges for accessing said apertures in said side panels.

12. A mounting system for mounting an electrical component in a corner of a room between two intersecting walls, comprising mounting adapter means having an outer perimeter configured and dimensioned to fit in said room corner between said corner and said component, said mounting adapter means having means for receiving fasteners in one or more locations in sufficient proximity to the room corner for securing the adapter means to room corner studs, the construction of said mounting adapter means and said component being such as to provide tool access for driving said fasteners and for positioning said component catercorner to said intersecting walls substantially symmetrically about the corner bisecting plane, said component and said adapter means being formed as an integral unit comprising a metallic sheet stock base structure having a generally rectangular panel mounting electrical elements, and two side panels extending respectively from opposite lateral margins of said rectangular panel convergently, a major portion of each of said side panels being orthogonally related to the major portion of the other side panel, each of said side panels in said major portion thereof having at least one aperture through which a fastener can be passed.

13. A mounting system according to claim 12, wherein an opening is provided in said generally rectangular panel for accessing each of said apertures in said side panels.

14. A mounting system for mounting electrical wiring devices in a corner of a room between two intersecting walls, comprising a mounting adapter having a cross-section configured and dimensioned to fit in said room corner between said corner and said devices and having a surface which when the adapter is mounted in said room corner is positioned catercorner to said intersecting walls to which a rear wall of said devices can be securely fastened for positioning said devices symmetrically about the corner bisecting plane catercorner to said intersecting walls, said adapter comprising a strip of metal sheet stock formed into a generally right triangular configuration but with the right angled corner missing such that the perimeter of the adapter has the shape of an isosceles trapezoid with a smaller parallel side missing, the widest parallel side or base of the triangle has a horizontally disposed slot when the adapter is placed in a vertical corner of a room, each of the non-parallel sides of the adapter has an aperture on a level with and accessible through said slot for enabling a fastener to be driven therethrough into a corner wall stud, and said widest parallel side has means for enabling one of said devices to be securely fastened contiguous thereto.

15. A mounting system according to claim 14, wherein said device fastening means comprises a threaded aperture, and means for establishing general registration between said threaded aperture and a corresponding aperture in a rear wall of said device for receiving a threaded fastener therethrough.

16. A mounting system for mounting electrical wiring devices in a corner of a room between two intersecting walls, comprising a mounting adapter having a cross-section configured and dimensioned to fit in said room corner between said corner and said devices and having a surface which when the adapter is mounted in said room corner is positioned catercorner to said intersecting walls to which a rear wall of said devices can be securely fastened for positioning said devices symmetrically about the corner bisecting plane catercorner to said intersecting walls, said adapter having means for receiving fasteners in one or more locations in Sufficient proximity to the room corner for securing the adapter to room corner studs, and a device with a housing having a rear portion in the shape of an isosceles trapezoidal prism with two orthogonally related side walls joined by a rear wall constructed to be fastened in engaged superposition to said adapter surface, the width of said rear wall being substantially equal to the width of said adapter surface such that said orthogonally related side walls fit snugly in said room corner when said adapter is mounted in said corner and said rear wall is fastened to said adapter surface.

* * * * *

UNITED STATES PATENT AND TRADEMARK OFFICE
CERTIFICATE OF CORRECTION

PATENT NO. : 5,349,134
DATED : September 20, 1994
INVENTOR(S) : JAMES P. RUSSELL It is certified that error appears in the above-indentified patent and that said Letters Patent is hereby corrected as shown below:

Column 5, line 48, "triangular" should read --in triangular--.
    Column 9, line 6, "in FIG. 26 the" should read --in FIG. 26, the--.
    Column 13, line 62, "claim 6," should read --claim 5,--.
    Column 16, line 23, "Sufficient" should read --sufficient--.

Signed and Sealed this

Fourteenth Day of January, 1997

Attest:

BRUCE LEHMAN

*Attesting Officer*     *Commissioner of Patents and Trademarks*